US011704367B2

(12) United States Patent
Boteanu et al.

(10) Patent No.: US 11,704,367 B2
(45) Date of Patent: *Jul. 18, 2023

(54) INDEXING AND PRESENTING CONTENT USING LATENT INTERESTS

(71) Applicant: A9.com, Inc., Palo Alto, CA (US)

(72) Inventors: Adrian Boteanu, Somerville, MA (US); Emily Dutile, Boston, MA (US); Adam Kiezun, Belmond, MA (US); Shay Artzi, Brookline, MA (US); Raju Matta, Needham, MA (US)

(73) Assignee: A9.com, Inc., Palo Alto, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/230,779

(22) Filed: Apr. 14, 2021

(65) Prior Publication Data

US 2021/0232633 A1   Jul. 29, 2021

(51) Int. Cl.
*G06F 16/00* (2019.01)
*G06F 16/9032* (2019.01)
*G06Q 30/0601* (2023.01)
*G06F 16/35* (2019.01)
*G06F 16/901* (2019.01)
*G06F 16/9535* (2019.01)

(52) U.S. Cl.
CPC ...... *G06F 16/90324* (2019.01); *G06F 16/353* (2019.01); *G06F 16/901* (2019.01); *G06F 16/9535* (2019.01); *G06Q 30/0631* (2013.01); *G06Q 30/0641* (2013.01)

(58) Field of Classification Search
None
See application file for complete search history.

(56) References Cited

U.S. PATENT DOCUMENTS

| 6,643,643 | B1 | 11/2003 | Lee |
| 9,317,566 | B1 | 4/2016 | L'Huillier |
| 9,426,190 | B1 | 8/2016 | Mccurley |
| 2006/0271524 | A1 | 11/2006 | Tanne |
| 2007/0220056 | A1 | 9/2007 | Arora |
| 2009/0192945 | A1 | 7/2009 | Perpina |
| 2010/0125531 | A1 | 5/2010 | Wong |
| 2012/0179696 | A1 | 7/2012 | Charlot |
| 2014/0172911 | A1 | 6/2014 | Cohen |

OTHER PUBLICATIONS

Non-Final Rejection issued in U.S. Appl. No. 16/141,220 dated Aug. 21, 2020.
Final Rejection issued in U.S. Appl. No. 16/141,220 dated Nov. 6, 2020.
Notice of Allowance issued in U.S. Appl. No. 16/141,220 dated Feb. 19, 2021.

*Primary Examiner* — Bai D Vu
(74) *Attorney, Agent, or Firm* — Hogan Lovells US LLP

(57) ABSTRACT

Systems and methods are disclosed for a system to provide an interface that is dynamic and that provides selectable links in response to a query for products in an electronic marketplace, where the selectable links are titled with the query and portions of reviews for products associated with the query. The system is configured to select feedback for items purchased from an electronic marketplace. Descriptors from the feedback are generated. In response to a query for the one or more of the items in the electronic marketplace, a determination is made that portions of the descriptors provide detail responsive to the query. An interface is displayed including selectable links titled with the query in combination with the portions of the descriptors. In response to selection of one of the selectable links, a portion of the items are displayed.

20 Claims, 10 Drawing Sheets

INDEXING AND PRESENTING CONTENT USING LATENT INTERESTS

CROSS REFERENCE TO RELATED APPLICATION

This application is a Continuation of, and accordingly claims the benefit of priority from, U.S. Pat. No. 11,036,801, filed as U.S. patent application Ser. No. 16/141,220, with the U.S. Patent and Trademark Office on Sep. 25, 2018, the entirety of which is hereby incorporated herein by reference for all intents and purposes.

BACKGROUND

Static databases and interfaces for searching provide static results after matching a query to a related tag associated with entries stored within the database. The static nature of the databases and the interfaces result from such matching which may be by a predetermined mapping of queries to the related tags. When reviews are ultimately provided for a result in a search service (e.g., an item purchased after searching using a query in an electronic marketplace), the reviews are for the benefit of a subsequent user of the search service. In an attempt to find their intended result, users are left with having to scroll through multiple pages of an interface of the search service, having to read through multiple reviews in multiple pages, having to request the additional pages from a server, and having to endure latency issues at each interaction with the server and with the use of the static databases and interfaces associated with the search service. For example, users searching for shoes for a particular activity may find pages upon pages of results that provide all shoes available within the static database. This requires users to endure at least the above technically disadvantaged process in their search to filter through the many results.

BRIEF DESCRIPTION OF THE DRAWINGS

Various embodiments in accordance with the present disclosure will be described with reference to the drawings, in which.

DETAILED DESCRIPTION

Figure 1:
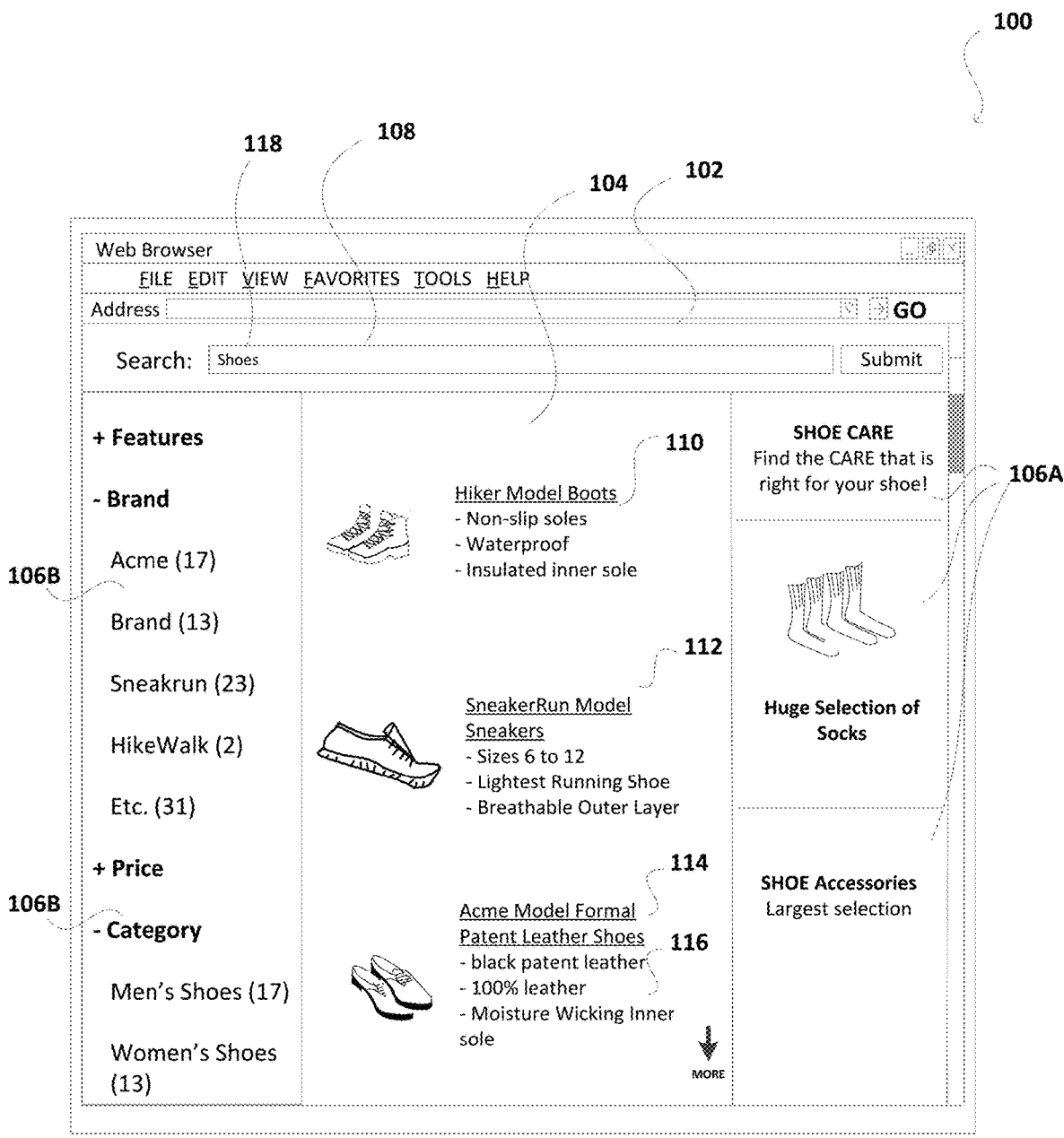
FIG. 1 illustrates an example of a window of display content that can be presented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to indexing and presentation of content, such as results for a current query in an electronic marketplace of items. For example, using feedback left after prior confirmed purchases of an item or from other trusted sources (e.g., a review left for a purchased item at a manufacturer's website), subsequent users may be presented with a query assist suggesting query options and/or categories for items possibly responsive to a subsequent query.

In an example, systems and methods herein parse feedback, such as reviews, for a first item that may be part of confirmed purchases at the electronic marketplace or left at a manufacturer's website. Descriptors from the feedback are determined and are indexed in an index database. The descriptors are portions of the feedback that describe at least one possible latent interest of an item from the feedback. The descriptors may describe activities, audiences, interests, and other pre-determined latent interests that are described in the feedback after users have used the item. Such latent interest may not be found in manufacturer descriptions of items and allows for further customer-friendly categorizing of items for a subsequent user of the system. The descriptors may be used to train a neural network with respect to an associated query. The query has association to an item or the descriptors may be indexed with association to the purchased item, for instance. Then, a subsequent user may be provided with one or more portions of the descriptors as part of a subsequent query—as query assists or categories, for instance—in an interface during a query time for the subsequent query. This may be by passing the query through the trained neural network and finding semantically classified descriptors. As the subsequent query is entered into a search area, a menu or other display region provides the subsequent query in combination with at least one portion of the semantically classified descriptors as selectable links to filter an initial set of items that is generally associated with the query itself. The resulting items are a categorized version of the initial set of items that are categorized by the semantically classified descriptors based on the association there between.

For example, prior feedback or prior reviews for shoes previously purchased may include statements such as "these shoes are great for hiking" or "I ran a marathon with this shoe and it felt really great." A filter module including a parser and a learning module may be trained with descriptors from the feedback or reviews associated with the shoes previously purchased. The filter module may be trained using its learning algorithms, including a semantic similarity algorithm, to determine that hiking and running are the descriptors from the feedback or reviews for the previously purchased shoe, for instance. The descriptors are determined because of their latent relationship or interest to features of the shoe—e.g., to activities or other features that share semantic similarity with the shoe—such as the hiking or the running activities, from the above example feedback or review. These descriptors—hiking or running—and their relationship to the query are stored by training a neural network to recognize the descriptors as semantically associated with the query, for instance. A further association is stored between the query and the shoe. Alternatively, these descriptors are separated and stored with information about their relationship to the item and the query. In a further verification process, only reviews for confirmed purchases and only reviews with pertinence may be parsed and have its descriptors determined. Pertinent reviews may be determined by running the review words through a neural network trained with semantic vocabulary from a query term and which may be separate from the above referenced neural network.

The descriptors are then used to dynamically modify the interface or a portion of the interface, such that when a subsequent user is searching for "shoes," a drop-down menu or other interface aspect displays selectable links forming query assists that assist the subsequent user for finding the right (or possibly intended or desired) item in the electronic marketplace—e.g., "shoes . . . for hiking," "shoes . . . for running," etc. These additional options were previously unavailable as manufacturers may not advertise these items for hiking or running, for instance, while prior users used them for these purposes and provided a feedback indicating suitable use outside the advertised use. The selectable links are, therefore, titled with the query in combination with at least one portion from the descriptors. While this is a non-limiting example of improved indexing, searching, and content presentation, this may also be extended to provide additional information or categorizing in the content presentation—such as including more exact information (e.g., excerpts) of the reviews or the feedback in the interface. When the selectable link is clicked, items associated with the descriptors and the query—that is items that were stored in a content database with an association to the descriptors and the query—are provided in a ranked order with the most relevant item at the top of a listing of entries.

Various other functions can be implemented within the various embodiments as well as discussed and suggested elsewhere herein.

In the present implementation, a technical benefit is achieved by ensuring that a portion of filtering of the content is now performed remotely at the server using a specific filter that cycles feedback or reviews from resources not easily available to a subsequent user to improve content presentation, indexing, and speed of content delivery to the subsequent user. This ensures that the content is provided responsive to a search in a partly filtered manner, which does not require excessive client-side filtering. Alternatively, this ensures that all filtering is performed at the server and no filtering options are offered on the client-side. In addition, by moving the filter to the server and making it remote from the client, the technical benefits gained include an ability to dynamically modify the categories of resulting items to match presently described usage. Another technical benefit gained is the ability to securely manage the filtering of data on the server side that overcomes prior reliance on user's input which may incorrectly filter away the most relevant items. These benefits are additional to resolving at least the latency and poor content presentation issues raised with static databases and with static interfaces under existing search technologies. The present solution, additionally, represents dynamic interfaces for the improved content presentation and a new type of analysis that relies on feedback and reviews to improve the indexing and speed of content delivery that was not previously considered.

In an example, modules performing at least the parsing and the determination of descriptors may constitute a filter that relies on semantic learning. The descriptors of reviews may include latent interests that may be missing from a brochure or manufacturer-provided information for the products or items that describe its intended usage. Subsequently, when a query is received for the products or items in an electronic marketplace, it may be determined that portions of the descriptors provide details responsive to the query. When such determination is made, along with a further determination that the query corresponds to the products or items available in a database, then the interface that may be dynamic is provided to the querying device. In an instance, the interface includes listing of entries that are responsive to the query as selectable links. This disclosure uses listing of entries or listing of items interchangeable to refer to results that may include item by names or descriptions, if applied in an electronic marketplace. For example, the items are not the actual items, which may be referenced by the names or the description provided in soft format. In an alternate implementation of the use of listing of entries, the listing of entries may be injected into the interface at display time or after the display time of the interface. Each selectable link is titled with the query in combination with at least one portion from the descriptors.

FIG. 1 illustrates an example of an interface 102 that can be presented in an application 100 on a screen of a computer in accordance with various embodiments. In an example, the interface 102 is a window, a website, or application screen of a web browser or a stand-alone application for interacting with the display content and for executing dynamic scripts within the interface. A user may search or interact with the interface via a search field 108. The content may be news articles, products, items, services, or other electronic or non-electronic media. A query 118 is provided in the search field 108 in one implementation of the searching or the interaction with the interface. When the submit option is selected, the search may be initiated and processed on the computer or on a server as discussed subsequently in this disclosure. In example 100 of FIG. 1A, a query 118 for "Shoes" is entered into the search field 108, and the interface provides a results section 104—e.g., a webpage or portion of a webpage 102. As illustrated, there are three results 110-114 in the interface, with an indication (e.g., down arrow with text "MORE" at the bottom of the page 102 or the grey scroll indicator on the right of the page 102) for more results if the interface is scrolled. The display content may each include summary specifications as shown in example 114 by reference numeral 116. Categories within the interface are presented on one side, region, or area 106B of the results, while sponsored and other content may be displayed in other available sides, regions, or areas 106A.

Results 110-114 may be fetched based on prior behavioral clues from users' prior searches. For example, in line with a static database, items and item names that were previously searched by users and that information may be used to skew the results. The results also share terms with the query, which may form a basis for the searching and presentation of the results 110-114 in an allocated area or slot, e.g., results 104. Indeed, the provided title of the content of each search result 110-114 may reflect a pre-determined title, such as the item or product brand name or model number or number as it is stored or allocated for storage in the static database. The title may be static. For example, Hiker may be a brand or model name for the boots in entry 110. The results 104 are, therefore, a skewed match from at least one term recited within an entirety of description available in a database for each item available through the interface 102. The description may be stored in a static dataset to at least match with one or more query terms.

Results 110-114, however, are limited to pre-defined descriptions from brochures and other information provided for items in the static database. This may not reflect information from actual users, for actual uses, or from other sources for the items. Here, even though a reviewer of the results may then select an entry from the results 110-114 and read available reviews, the reviews may be to unrelated characteristics associated with the item that is subject of the user's query. For example, the review may describe shipping efficiency of a seller of the item or may describe condition of the item as received. In addition, there may be several pages or entries of the reviews. The reviews may also be more information that does not address concerns of a user—e.g., whether the item is good for a specific activity (e.g., hiking, running, events, etc.), a specific audience (e.g., parents, music lovers, travelers, etc.), a specific interest (e.g., charity, festivals, urban exploration, etc.).

Moreover, as the database is static and provides no room for relating specific latent interests, to the query and to stored item descriptions, the results obtained from the database may be stagnant or dated. New uses for existing items may be discovered by users and this information may not find its way to the dated or stagnant information of the static database. Therefore, relying on past user behavior alone may not generate information as to stored item descriptions. The static query-results interface is also limited to requiring a user to filter the reviews to determine if items are relevant to the latent interests of the user. As such, the process using a static database and query-results interface is technically limiting.

One of ordinary skill would recognize that a website promoting or selling items, including services, and its hosting servers may not provide support to dynamic interfaces or database structures capable of updating using review or feedback information from other websites or the review portion of the website. Alternatively, it may be the case that the items provided are not usable for other latent interests and negative tones of the feedback or review is not taken into account to affect visibility in the rankings of results of certain items. The results may therefore be distributed over many pages requiring constant communication and receipt of information from a server as the results are scrolled. These issues may be a consequence of an inability of the host servers to index data in a manner to include feedback or reviews, which require some of dynamic indexing to be able to account for the latest reviews and feedback. In an example, indexing may be by storing data as inter-referenced rows and/or columns in a multidimensional table. A trained neural network may be in the form of a trained dataset indexed in the manner described throughout this disclosure. These issues may also be a consequence of the host server's inability to efficiently process data, resulting in latency issues as results are gathered for display. This inefficiency also causes increased traffic as the user scrolls through items or reviews requiring the client device to constantly involve the server for further listings. This results in decreased user experience. The solutions in this disclosure includes systems, and software or firmware configurations that are available to modify the interface to include results that are in a dynamic form, such as providing an option at the time of entry of the query to include the query with category and/or additional information extracted from feedback or reviews left by users or prior purchasers of associated items or products to the query.

The category and/or additional information represent latent interest from the feedback or review, which may correspond to an unwritten interest in the query predicted by the system or method as a user types in the query or portions thereof. In a deviation from the categories that are predetermined and provided in side, region, or area 106B, the categories presented in the dynamic interface may be drawn from the latent interest—e.g., when an item associated with the result is identified from prior reviews as being particularly used for specific activity, a specific audience, a specific interest, or other latent interests, this information may be used as a category and/or query assist in area 106B or in a separate menu provided at query time or subsequent to a received query. A user may then select from the category or query assist (e.g., "shoes . . . for running, . . . for hiking," " . . . for formals," " . . . for children," etc.) as opposed to the categories presently shown in area 106B, which are based off of a catalog or a pre-determined standard category associated for such products. A typical query for shoes may otherwise generally bring up shoes available in a database and may generally bring up standard categories, such as men's shoes, women's shoes, etc., as categorized by a manufacturer. Furthermore, the general categories are not dynamic and may not be within the latent interest categories. As a result, a website incorporating the present solutions, include configurations in an associated host server, to reduced latency and reduce misdirected traffic using categorized results responsive to a query based at least in part on prior feedback received.

Figure 2:
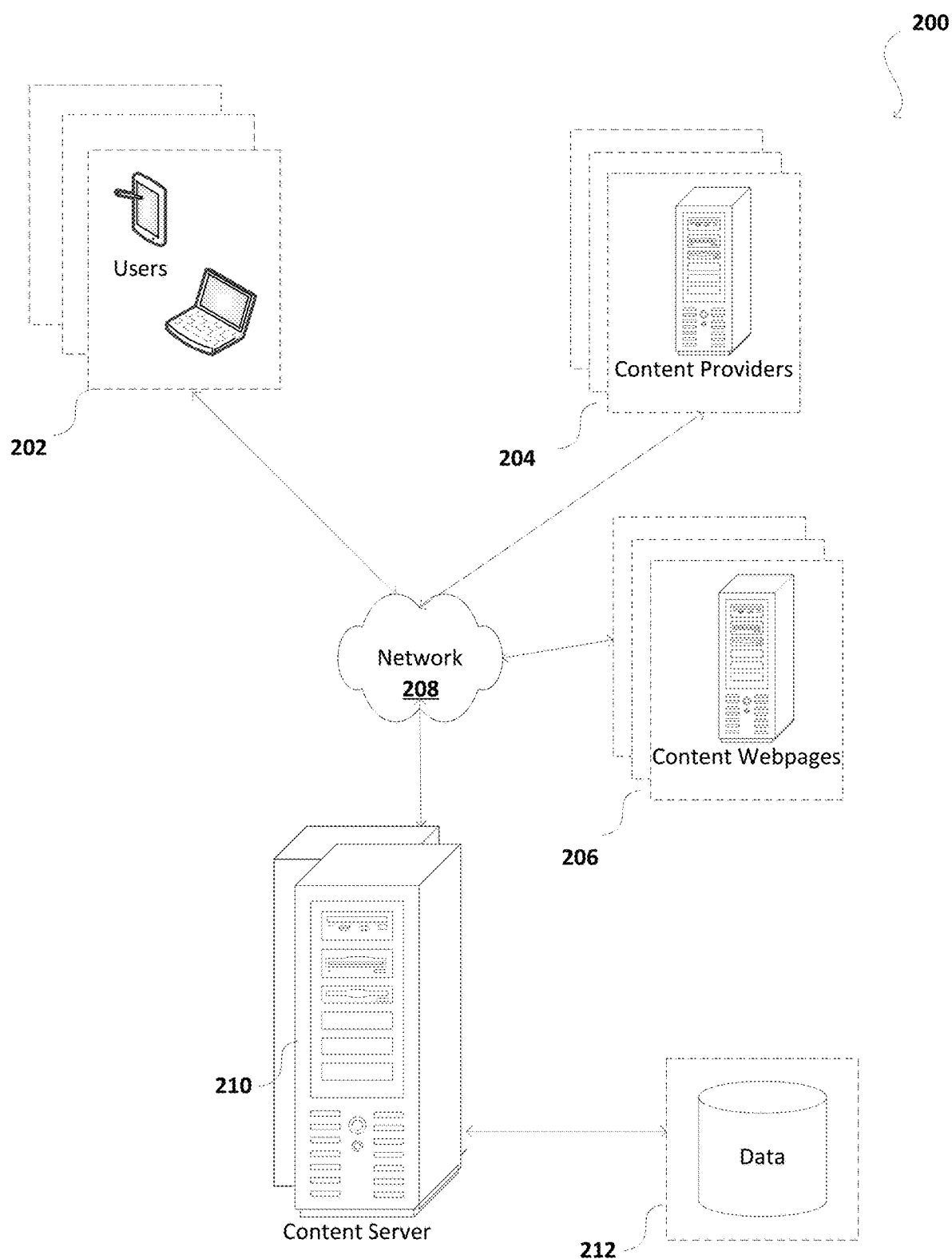
FIG. 2 illustrates an example system architecture for performing the disclosed embodiments in accordance with an aspect of this disclosure.

FIG. 2 illustrates example system architecture 200 for performing the disclosed embodiments in accordance with an aspect of this disclosure. Example environment 200 may include computing components and network relationships that are applicable for providing the content in the webpage or interface 102 of FIG. 1. The example environment 200 includes a content server 210 for serving content, including all or a portion of the interface 102, in response to a search or interaction on the webpage or interface 102; a database 212 for storing content from content providers 204 (e.g., product information, service information, advertisement, and other related information; news, social media, and other product/service related content from which information is gleaned for use in the present system. Further, advertisement networks may provide paid content (e.g., content in section 106A of content page 102), and users with computing devices 202 may send queries or interact with the content server to access the paid content (e.g., advertisement) or unpaid content (e.g., digital information for products and services that may be referred to or available for purchase via the content server 210).

Content providers 204 are able to utilize respective computing systems and/or devices to interact with the content server 210 through the network 208, for example, a local area network (LAN) or wide area network (WAN), e.g., the Internet. Similarly, users with computing devices 202 are able to utilize their respective computing device to access content (e.g., websites or stand-alone web enabled applications 102) that may be offered through the content server 210 or via the content providers 204 over the network 208. For example, content providers 204 can provide content (e.g., webpages, product information, etc.) that is accessible over the network 208 (e.g., the Internet). In such an example, the content providers use the content server as a host for interacting with the users/client devices 202. In an alternate implementation, the content server hosts its own services for providing content of the content providers 204, such as an electronic marketplace. In yet another alternative implementation, the content providers 204 may utilize one or more of its own computing systems to provide a website or web-enabled application that is accessible through the network 208. In such an implementation, the content server 210 may provide referral links for content to the content providers' websites for purchase of associated products and/or services.

The content providers' website or web-enabled applications may offer opportunities to present additional, and in some instances, paid content to users accessing the website. For example, electronic advertisements or other digital media may be provided for newly released products based on the analysis of queries and news websites described herein. The computing devices and/or systems for each of the content server 210, content providers 204, content webpages 206 (e.g., news and social media), and users with computing devices 202 will each generally include memory for storing instructions and data, and at least one processor for executing the stored instructions that configure the computing devices and/or systems to perform the features disclosed. Further, reviews or feedback may be provided in content of a content provider 204 and may be retained by the content provider 204 or may be shared to the content server 210. In either case, the content provider 204 may provide explicit access to the reviews and feedback for crawling and indexing by the content server 210.

When a user with a computing device 202 uses the computing device to access content from the content server 210 or content providers 204, the relevant content provider 204 can send, either directly or via the content server 210, responsive content to the computing device 202. This access for content can include various requests or searches to find specific content hosted by the content server 210 or content providers 204. Further, content server 210 may be a special status host and may have special access ability to stored content and indexed feedback from various content providers 204 that are hosted on or released to content webpages 206. This process allows at least a portion of content and feedback to be dynamically updated, and allows the feedback to be indexed to provide sufficient new information to interested parties in future searches via content server 210. Accordingly, content server 210 may include cookies, authentication certificates, or signed certificates to enable such access to protected content hosted in content webpages 206.

Figure 3:
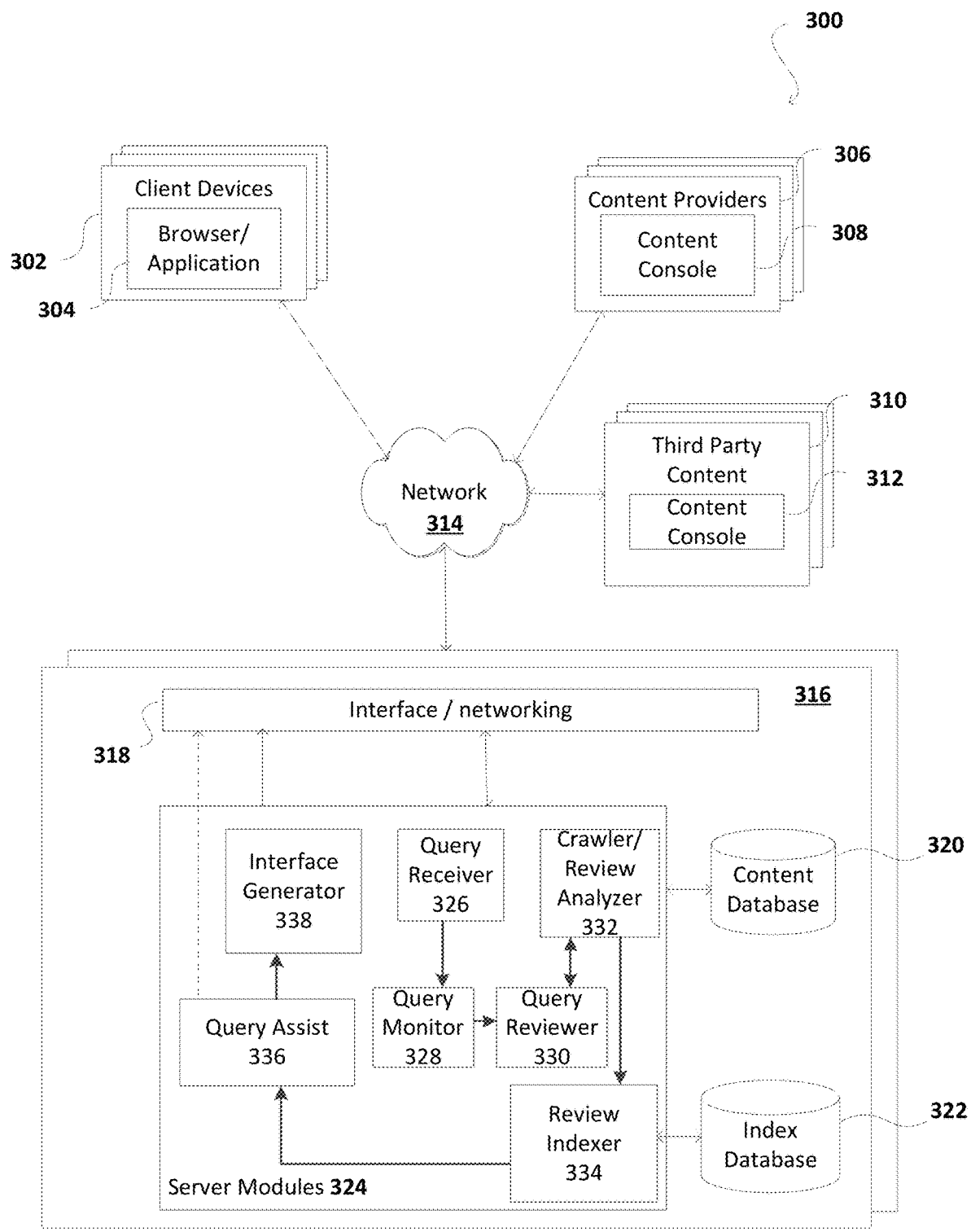
FIG. 3 illustrates example system architecture for performing the disclosed embodiments in accordance with another aspect of this disclosure.

FIG. 3 illustrates further example system architecture 300 for performing the disclosed embodiments in accordance with a further aspect of this disclosure. The system architecture 300 includes content providers 306 in communication with content servers 316 and with client devices 302, via network 314. As noted with respect to FIG. 2, the content providers 306 may incorporate features of the content servers 316 as discussed subsequently herein to process content in a similar manner as the content servers 316. Client devices 302 and content provider devices 306 can include any processor and memory based electronic devices with capabilities as disclosed herein, but at least with the capability to execute computer-readable instructions in a browser or to execute computer-readable instructions with or without a browser. These electronic devices are described in detail below and include specific configuration to perform the functions herein. Such electronic devices may include personal computers, tablets, ultrabooks, smartphones, cell phones, wearable watches and related devices, handheld messaging devices, laptop computers, set-top boxes, personal data assistants, electronic book readers and the like. Each of these electronics devices may be configured to include a browser or a stand-alone application 304/308 that is capable of being configured in the manner of this disclosure. In an implementation, content providers 306 may use one or more of content servers 316 to run tests on hardware and software features or services offered in the system architecture 300. Users or consumers of electronic or online products and/or services use the client devices 302 to interface with a website providing such content, including reviews and feedback to either the content providers directly or to the content server 316.

Network 314 can include any appropriate network, including an intranet, the internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 300 can depend at least in part upon the type of network and/or environment selected. Protocols and components for communicating via such a network are well known and will not be discussed herein in detail. Communication over the network 314 can be enabled via wired or wireless connections and combinations thereof. In this example, content server 316 may include one or more local servers in communication with each other and with other remote servers via the network 314. In an example, the content server 316 includes a web server for receiving requests and serving content from the client devices 302 and/or the content providers 306. In response thereto, although for other networks, an alternative device serving a similar purpose as any one of the content server 316 could be used, as would be apparent to one of ordinary skill in the art upon reading this disclosure.

In a further example, the content providers 306 may include a content console 308 for communicating with the content server 316. The content console 308 may be an internet-enabled application (e.g., browser/stand-alone application) that is configured to execute on the content provider 306 and that is configured to communicate with the content server 316 in the manner described herein. The communications between the content server 316 and the servers/devices of FIG. 3 are via an interface or networking component 318, such as a network interface card or a wireless interface. In alternate embodiments, the system architecture 300 is maintained internal and confidential between the content providers 306 and the content server 316 during the configuration stages. Accordingly, one or more components or modules in the system architecture 300 are isolated from external influence by any known security methods, including firewalls, during configuration stages. Alternatively, sections of the one or more components or modules in the system architecture 300 are available within one or more content providers 306. In yet another alternative implementation, sections of the one or more components or modules in the system architecture 300 may be secure, while other sections of the one or more components or modules may be available in the public domain to interface with client devices 302. In accordance with such alternate implementations, one or more components or modules in system architecture 300 may also be virtual machines or operate in a virtual environment for performing one or more of the features disclosed herein.

Further, in the example architecture 300 of FIG. 3, real-time or dynamic results are provided for queries from the client devices 302. For example, queries are addressed in real-time or dynamically via server modules 324, which may include machine learning capabilities, interface generator 338, and query assist 336. Modules 324 and 336 may cooperatively function under two or more modes. In one of the modes, the machine learning features of select server modules 324 (e.g., crawler/review analyzer 332 and review indexer 330) may constantly improve upon itself using each new review or feedback from confirmed purchases of certain items to improve their respective machine learning algorithms to ensure robust functionality. Machine learning aspects are provided in the examples of FIGS. 5 and 6A-B. Such a mode may be referred to as a training mode. A mode in which the trained neural network is actively used for finding descriptors from reviews may then be an active mode for the neural network.

In an application of neural networks for the machine learning operations, the machine learning aspects of the modules may train one or more neural networks with each of the new review or feedback for a purchased item and for the used query, while running active operations with a copy of a previously-trained neural network. Once the new review or feedback has been trained to one or more inactive neural networks, the one or more inactive neural networks may be activated and the previously-trained neural networks may be inactivated for training. The use of the neural network to provide newly formed categories and/or to modify the interface by providing query assist represents an active use of a trained neural network. Alternatively, bulk new review or feedback for confirmed purchases is periodically received and parsed, and is also available to train one or more neural networks during an assigned downtime for each associated item. The trained neural network may be assigned a word from the item to which multiple query assist terms are trained.

In content server 316, the queries from client devices 302 may be received via module 326. Results webpage(s) or an interface is generated by module 338. In an example, the interface generator 338 is a module that includes HTML® and various dynamic scripts that are formatted for rendering on the client device 302. The dynamic scripts enable additional requests for information to populate an HTML® formatted page upon rendering on the client device, for instance. In addition, content server 316 includes a query monitor 328 for determining if there are new queries in the received queries.

In an example, new queries or new reviews may be used to search for relevance (e.g., semantic similarity) with each other and to items (by the titles or descriptions of the items, for instance) in the content database 320 after a confirmed purchase. When the relevance is determined, the portions of the reviews (i.e., descriptors) providing semantic similarity for the queries is used to retrain or further train a trained neural network in the index database 322. The new queries or new reviews are also associated with the item purchased after the query is processed to generate an item from the content database 320. In this manner, new or subsequent queries may be incorporated in the system by relating them with descriptors for providing query assists at the earliest possible time even though the query was never previously used. This may dynamically occur, where the system determines that a first time query is possibly related to descriptors and to an item for which categories were previously determined using prior reviews or feedback.

Query reviewer 330 is a module that may be separate or part of the query monitor 328, and that may review the queries via the above-referenced semantic matching process to determine if any of the new queries have semantic associations with new or prior reviews or feedback. This ensures that the query assist is current with new terminology in new reviews and with new terminology in new queries. This also ensures that no matter how new a query may be, a query assist may be provided so that a user is at least somewhat likely to find what was initially intended. In the event that a semantic match is not found—evidenced, for example, by a lack of classification of the new queries in a trained neural network with existing descriptors—then the trained neural network may be retrained with the new queries.

In a further aspect, the descriptors are determined from reviews or feedback parsed from a webpage after a confirmed purchase or left on other trusted websites as described earlier. The descriptors may be determined by a machine learning algorithm of module 334, as having similarity and/or semantic relationships to terms in a query after the confirmed purchase. Alternatively, the similarity and/or semantic relationships used to determine the descriptors are based in part on a description of an item on a website related to the item. In this manner, even though the description may be limiting and not be used directly, semantic similarity is confirmed to a feedback left for the item because of latent relationships in the language used in the feedback to the item description. The similarity and/or semantic relationships may also pertain to implementations where the terms in the query and the terms in the feedback share a relationship, including common occurrences—together in a sentence of the review—for instance. A proximity feature of the semantic relationships may also take into account that the common occurrences of the terms in the review or feedback are within a predetermined number of words from each other. Furthermore, descriptors may be used alone or with excerpts, as an aspect of this disclosure, to provide further content for the title of the selectable links. This allows the query assists to provide more than a latent interest as a category, but also to provide a personalized message with the latent interest, for instance. The title to the selectable links may then be a portion of the descriptors or all of the descriptors generated from a review or feedback. The excerpts may be stored in the index database with the descriptors for retrieval.

Reliance on semantic relationships between the query terms and the review terms in the machine learning process then inform the system that a subsequent query for an item, e.g., "gaming consoles," "xbox one," etc., has terms with semantic association to review terms extracted and indexed from prior reviews as the descriptors. For example, the system may parse the following prior reviews: "the xbox one is a great gaming console for professional garners" and "the xbox console is excellent for mobile game"; then, assuming that these prior reviews are from confirmed purchases or from other confirmed or trusted sources (e.g., reviews on the manufacture's website), the descriptors are obtained. The descriptors may be obtained by a neural network trained to reject articles in the language or that can reject superfluous terms, while retaining nouns and adjectives, or by retaining phrases for use as excerpts. These nouns, adjectives, or retained phrases may be semantic versions of the query. Separately, the descriptors are identified and trained to a neural network as described with respect to FIGS. 5, 6A, and 6B. The neural network used for training between reviews to queries is referred to herein as a review-to-query neural network to distinguish from other possible machine learning processes used in a preliminary step to select reviews for training the review-to-query neural network.

The determination of the descriptors then provides the index database 322 with terms to be indexed for subsequent retrieval. Alternatively the trained review-to-query neural network may be stored in the index database 322. In the above example reviews, a review-to-query neural network may be trained with descriptors (using words or combinations thereof) from the reviews: "professional gamers," "professional," "gamers," "mobile games," "mobile" and/or "games." This may be by rejecting other language in the review and/or by determining that these terms are semantically related to the query terms of "gaming consoles" and "xbox" from prior searches leading to the confirmed purchases or being from the confirmed or trusted sources. The descriptors may be stored as they are picked from the review—in pointers or matrices—with association to the items purchased after the query was completed and/or to the query itself. The review-to-query neural network provides association made between the query and the descriptors so that when a subsequent query is input to the review-to-query neural network, descriptors with semantic matching are provided as output. The output descriptors are then combined with the subsequent query and provided as query assist titles with an underlying selectable link. A selection to the selectable link causes items associated with the query to be further filtered according to the items' association with the descriptor. For example, the trained review-to-query neural network, now understanding the association of past queries to the descriptors is able to provide query assists so that when a subsequent user enters the subsequent query such as "gaming consoles" in a search area of an interface, the interface is modified to present selectable links titled with the query and a portion or all of the descriptors. The subsequent user querying for "gaming consoles," therefore, is presented with the following query assists: "gaming consoles . . . for mobile games" and "gaming consoles . . . for professional gamers." Then selection of the "gaming consoles . . . for mobile games" will cause an underlying selectable link to filter gaming consoles to the ones identified in prior reviews as for mobile games.

In a further aspect, the portion of the descriptors may be associated to the items, in the content database 320, as a category for the items so as to enable the above filtering. For example, an item entry for the gaming consoles in the content database includes a reference to each descriptor. This reference may be by a tag entry for the items in the content database and the same tag entry may be used for the associated descriptors in the index database. Such an association ensures that when the interface generator generates the interface with the content information for items responsive to the search, then the index database provides the categories or other information (e.g., excerpts of reviews) for the query assist module 336. The content information and the query assist are injected into the interface from the interface generator 338. Subsequently, the query assist may modify the interface in real time by providing further query assists if the user performs a second search and/or makes changes to the initial search. As such, the content database may also provide responsive items as the search changes. In an implementation, the content and the index databases 320, 322 are a unified database with linked keys to provide reference there between.

In an example, there may be a process to qualify received reviews prior to usage of the qualified reviews to train the review-to-query neural network. Such an implementation improves efficiency of computing devices by requiring the review-to-query neural network to only be trained when relevant reviews are available. The processing of excessive inputs in a neural network—such as for training purposes—is an extremely processor-intensive operation. Any reduction in the processor usage as well as reduction in time for training of neural networks will allow for the active usage (e.g., uptime) of the trained neural network. In an example, a qualifier neural network may be used for qualifying that a review is indeed relevant prior to its usage in training the review-to-query neural network. For example, reviews discuss other unrelated issues to an item than the actual item. Such issues may be shipping issues, condition of the item, etc. In an implementation, only actual use, target audience, or interest are latent interest bases for semantic similarity with query terms. There may be other latent interests that may be addressed according to an intended usage of the present disclosure. As such, a qualifier neural network may be able to weed out the unrelated reviews from the received reviews by a classification process where words in the reviews are assigned values and are subject to discrimination.

The classification process will identify words such as "shipping" and "quality" as outside a desired classification area in a two-dimensional (2D) classification process adopted in the qualifier neural network, for instance. One such 2D classification process may allocate neighboring values to synonyms than antonyms for certain words. A classification based on such allocation then separates reviews with unrelated words (and their variations) from the reviews intended for the query. It will be understood by a person of ordinary skill reading the present disclosure that "quality" may be an intended latent interest. When this is the case, the review-to-query neural network may be trained to accept "quality" as a category and latent interest for query assist. The qualifier neural network is also then trained to make a similar acceptance of reviews to one or more items that discuss quality.

Figure 5:
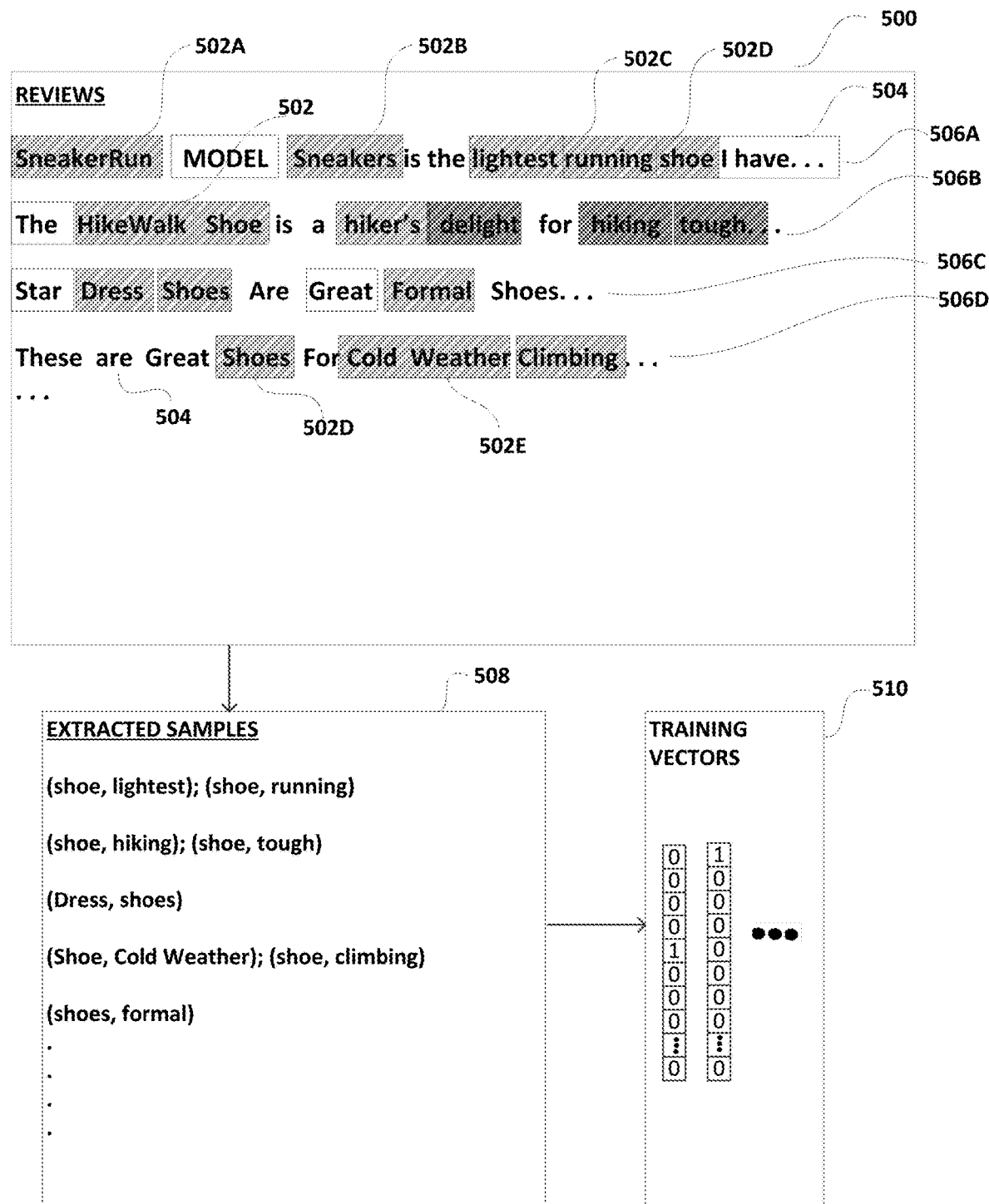
FIG. 5 illustrates an example of semantic processing for machine learning in accordance with various embodiments.
Figure 6A:
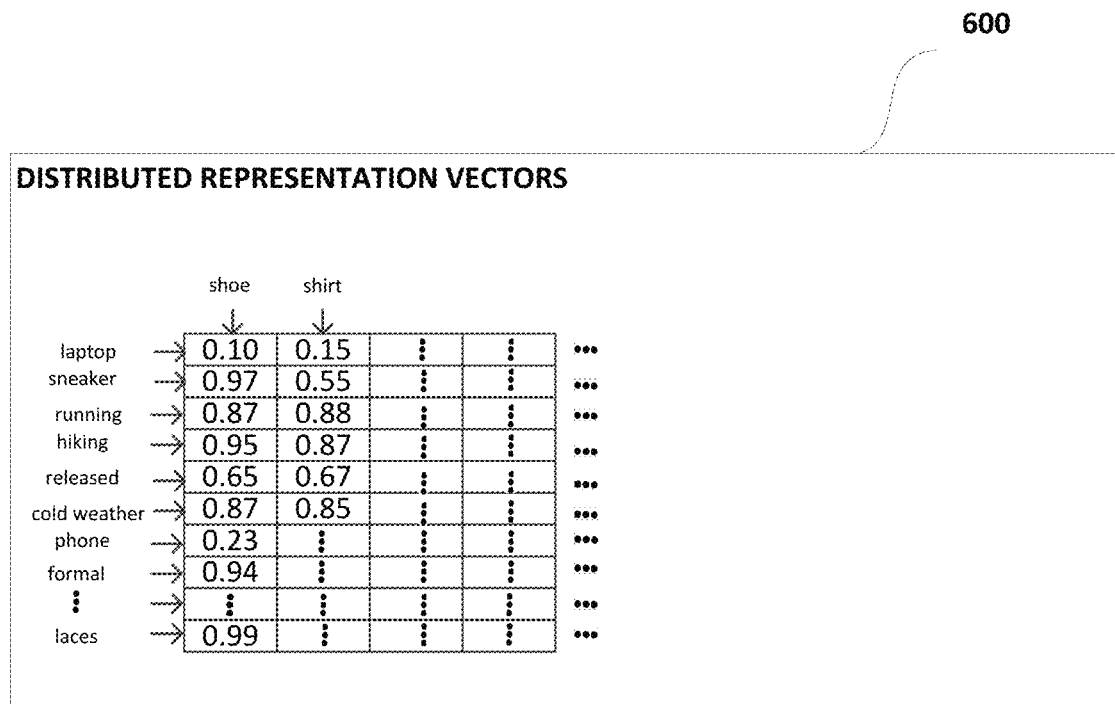
FIGS. 6A and 6B illustrate other examples of semantic processing for machine learning in accordance with various embodiments.
Figure 6B:
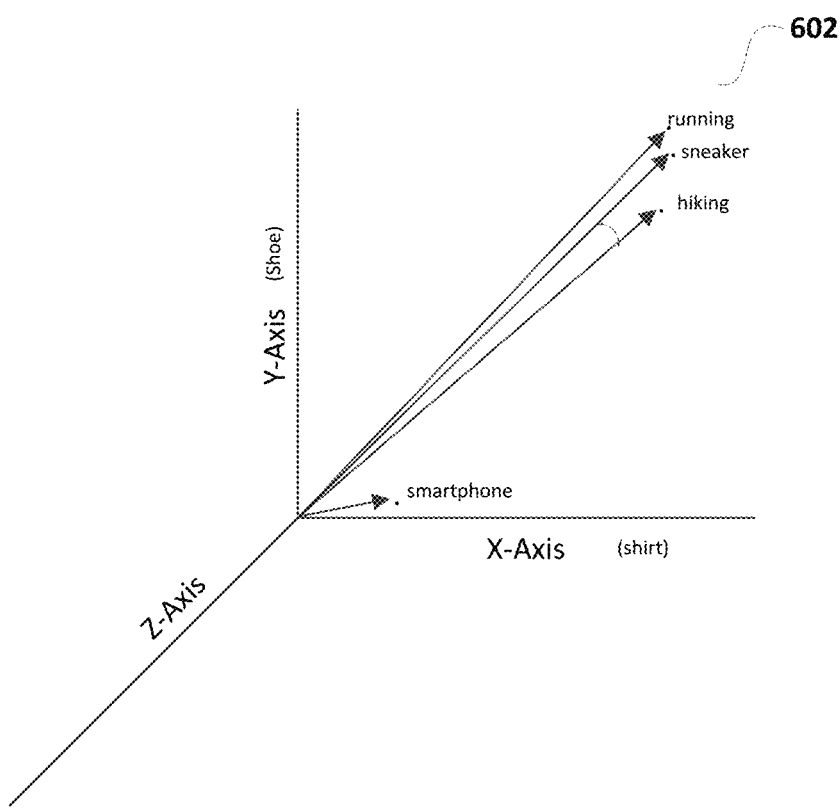

The example process in FIGS. 5, 6A, and 6B are to such assignment of values to words and/or phrases and to the use of these values to train a neural network and to verify the classification attained in the trained neural network. This training, in turn, represents training of a neural network to classify select words—such as descriptors for queries in the review-to-query neural network and relevant reviews over irrelevant ones in the qualifier neural networks. As such, the example process in FIGS. 5, 6A, and 6B apply generally to both the qualifier neural network and the review-to-query neural network. For the qualifier neural networks, tangential language not commonly used to describe the item itself—e.g., discussion in a review as to installation required for an item may be an outlier within the classification for a relevant review. However, it may also be the case that "installation" or "easy installation" described in reviews would be category or latent interest provided in response to a query for an item that requires installation. As such, reviews discussing ease of installation may be incorporated into the review-to-query neural network and may be tagged to an item and to a query, such that when the query is applied in a subsequent search, the interface is modified to present the query in combination with the option to find items with "easy installation"; e.g., for a query of "furniture," a modified listing of results includes: "furniture . . . for easy installation" as a selectable option or link. In an example, the subsequent query may be determined as associated with a category based on a classification of at least one portion of the subsequent query in a classified dataset that provides categories and content. Category-specific content may be determined for the category and portions of the descriptors may be then determined from the category-specific content.

In an example, variations to terms are considered within the classification capabilities of the neural networks described herein. An activity described in a review is much more likely to be described in another review bringing two assigned values to terms within the reviews together, even if they have slight variations—e.g., noun usage, verb usage, etc. This is possible when a review describes a shoe as "great for hikes" versus another review that describes a shoe as "excellent shoe for hiking the Appalachian Trail and fast shipping." These two reviews provide variations to the term "hike," which is still related and still describing an activity that is strongly associated (by at least semantic association/similarity) with a particular item and that is not described in any manufacturer produced material for the particular item. The qualifier neural network herein is able to qualify these two reviews as proper for further classification with the review-to-query neural network. However, the language of "fast shipping" or "no instructions provided," etc., would classify outside of a classification area that attempts to classify terms from the two reviews under a qualification of the two reviews.

Further, as both hiking-related reviews were left after a purchase of a shoe, then the query terms associated with that purchase alone, or with the addition of a confirmation of the purchase of a shoe may be used to determine feature descriptors (e.g., the activity of "hiking") as relevant to shoe. In addition, two or more words of parsed reviews or feedback may be used in different combinations for the qualifier neural network as well to train the subsequent review-to-query neural network for semantic relationships of the review with the query terms.

In a further aspect, noun identifiers may be weighed preferably over articles and other grammar portions, which may then be wholly or partly rejected, from the reviews. Further, words of the reviews or feedback are analyzed against individual words across multiple queries for a confirmed purchase. In a process to eliminate false positives, the words must be identified as similar and/or semantically similar by the qualifying neural network using prior queries or content stored in the content database 320 to ensure that queries or items exist to classify the reviews or feedback with the words in content database 320. Indeed, if no content is seen as matching, then it is likely that the words or terms from the review relates to description that is improper or that relates to an item not previously indexed. Each word in a review may be taken with another word of the review to find correlation to the word pair. In an alternate aspect, from one review, two words are taken as a single word and then combined with one or more words to find correlation between the newly formed words and other groupings of review words or terms. Semantic relationships and/or similarities are measures from assigned values to the terms in queries or the reviews that may be stored with the terms or that may be determined at query time and are then applicable to provide a related term to each query entered into a search area of the interface.

In an implementation, the descriptors, having been determined as semantically similar and/or plainly similar between received queries and reviews are then used to categorize items related to the queries. For example, instead of providing pre-determined categories as previously noted in regards to FIG. 1, the query assist 336 modifies, either at query time or subsequent to query time, the interface by input to the interface generator 338 to provide dynamic categories as noted in regards to FIG. 4. At query time, the query assist 336 provides the dynamic updates to the interface as the query is typed—either by letter, word, or phrase of the entered query. Further, when terms in queries are associated with descriptors of index database 322 and to items within a content database 320, then further relationships may be studied from the associated descriptors and further categories may be provided for the item. There may be a limit to this process as the existence of too many categories with few items or overlapping items may confuse a reviewer. In an example, only certain regions of the interface are dynamic and the entire interface does not need refreshing or reloading for the presently recited modification to be performed to the interface.

The crawler/review analyzer 332 uses web identifiers, such as hyperlinks, Uniform Resource Identifiers (URIs), or Uniform Resource Locators (URLs) of review websites, product websites, or of internal webpages of an electronic marketplace to determine new reviews from trusted sources. These may be confirmed reviews left at the content provider 306 or the content or third-party content 310, instead of on an electronic marketplace hosted by content server 316. As newly retrieved reviews are obtained, it is likely to be the case that the webpages providing these reviews (e.g., from content provider 306 or the content or third-party content 310) include a link to the product description or domain of the manufacturer, retailer, or distributor of the newly released item. Alternatively, when stored in the electronic marketplace of the content server 316, such reviews may be stored with the items information in the content database 320, which is also shown as available to the crawler/review analyzer 332 and the review indexer module 334. The hyperlinks determined as embedded in such webpages and in other trusted sources providing the reviews—e.g., certain social media webpages 310, may be extracted and provided as part of the reviews for qualification and for description of other latent interests for subsequent queries.

The web identifiers determined as embedded in manufacturer websites and trusted webpages corresponding to third-party content 310 may be retrieved, analyzed, and indexed (with the descriptors, for instance) in the index database 322 by the review indexer module 334. In an example, the at least one of the web identifiers of a content website corresponding to the third-party content may be parsed to determine domain information. Then a confidence score may be determined as associated with an entity owning or operating the domain based at least in part on the domain providing information for the first item. For example, if the domain belongs to a distributor or manufacturer of an item sold in the electronic marketplace, then reviews left in a website of the domain bears confidence for indexing in the index database 322. Particularly, when the confidence score exceeds a threshold value, then the reviews from the content website for the interest descriptors may be provided for indexing. In a further aspect, parsing the content websites is to select sets of contiguous words associated with the first item. When at least one set of contiguous words is selected, a count may be incremented to reflect this. Subsequently, the confidence score may be also weighed favorably for the domain when the count satisfies a threshold.

The review indexer module 334 may retrieve and generate the association between descriptors and query for the content database 320 and for the interface generator 338. The query assist 336 may then retrieve content and one or more portions of the descriptors (including excerpts if available and if required) and provide this to modify the interface generated by the interface generator 338. Further, the query assist 336 may, alternatively or concurrently, modify the interface to provide new descriptors over the at least one portion of the already provided descriptors in the interface. In addition, the query assist 336 may be part of the review indexer module 334, and may perform the modification of the interface along with (e.g., concurrently with) the generation of the interface.

In an example, rankings are provided to the results based at least in part on an amount of semantic similarity between the query and the descriptors determined as sharing semantics with the query. The interface may then include ranked query assists of the combinations of the query and descriptors and/or ranked results—e.g., 1, 2, 3 . . . etc.—representing a maximum number of query assists and/or of results for one page of the display content. The maximum number of query assists and/or of results is configurable by the user to display more ranked results per page of the interface. When the modification to the interface is performed, content for the query, including item information with the query assist may be provided above the ranked items. Such item information may include an identifier and a portion of an underlying specification or other information for the item. Alternatively, the item information replaces a prior result list and new entries are provided with new categories marked in an area adjacent to the item information. In one aspect, content for the new item or new category information is provided in a "1" ranking, while the existing listing of items is moved down to 2 or subsequent ranks. Such a modification may occur dynamically, as the query is entered, changed, and/or as required for generating results more in tune with the query, based in part on the descriptors from prior reviews determined as associated with the query. Alternatively, the interface includes an area for the new content under a special ranking—e.g, a ranking representation of "0" implying a default status at the top of one or more pages in the display content. As such, the intervening ranking may correspond to modification of the existing rank or insertion of a ranking or placement that would position content with certain items for more visibility than the remaining results.

In another aspect, the interface is modified after being provided to the client device 302. When the interface includes dynamic script that requests for updates to the results—to maintain updated results as the query change—the query receiver 326 and query monitor 328 may provide the content corresponding to the new query and any descriptor from the module 334 to modify the interface. As previously noted, modification of the interface includes modification of portions of the interface and/or modification of the results and/or categories for the results. In a further aspect, module 336 and/or module 338 modify the results and/or categories as the interface renders on the client device 302. In such an aspect, a slot or allocated area is designed in the interface for providing updated information or for providing most relevant new information to the client device 302. The slot or allocated area is a dynamic area to incorporate the new information in a dynamic manner, and represents an updated look and feel for the interface. Moreover, the use of the interface provides a graphical user interface (GUI) that is dynamic—offering accurate and up-to-date content that is distinct from static content of search results previously described. The use of such interfaces ensure that real estate in the GUI exists to present existing content to a submitted query as well as to modify the interface for accurate and new information when the query is changed. Retrieved content from the content database 320 and from the index database 322 is subject to the formatting and presentation in the interface as described by formatting rules of the interface generator 338.

Further, in an aspect to reduce processing time required to respond to queries and to reduce latency is display or dynamic display of query assists, a category-specific searching process may be used along with one or more embodiments of the disclosure. In this aspect, when the query is received, the query receiver 326, along with the query monitor 328, and query reviewer 330 (or one of these modules) may be configured to determine that the query is associated with a category based on a classification of at least one portion of the query in a classified dataset that provides categories and content. A determination is made for category-specific content for the category. With this information, at least one of the portions of the descriptors from the category-specific content may be identified to provide the query assist. In this manner, the system is able to respond faster using descriptors from within the category alone instead of the entire index database of descriptors. Furthermore, portions of the feedback as the descriptors may be indexed with an association to the category-specific content. This may by the review indexer module 334. As a result, the portions of the descriptors for the combination with the query may be provided when the category-specific content is determined as being in the content category for the query.

Figure 4:
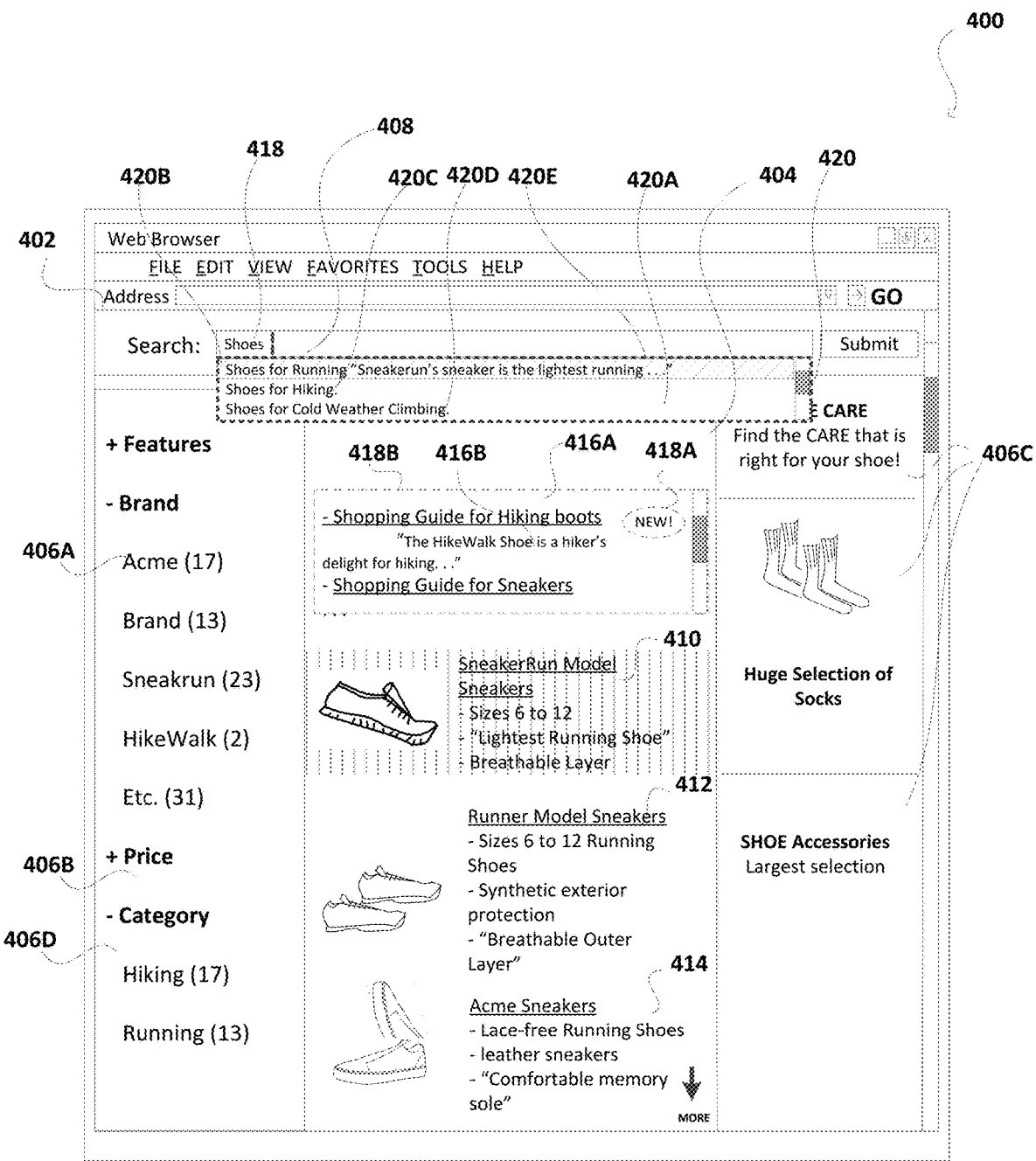
FIG. 4 illustrates an example of a window of modified interface that may be dynamic and that can be presented in accordance with various embodiments.

FIG. 4 illustrates an example 400 of a window of an interface 402 that is modifiable and can be presented in accordance with various embodiments. This example, like the example of FIG. 1 utilizes an electronic marketplace as the content at issue. In the example 400, like in example 100 of FIG. 1, the window may be a web browser or a stand-alone application for interacting with interface 402 of the electronic marketplace. A user may search or interact with the interface 402 via a search field 408 or via selecting various content 406-418. A query 418 is provided in the search field 408 in one implementation of the searching or the interaction with interface. When the submit option is selected, the search may be initiated and processed on the computer or on a server as discussed in the implementations of FIGS. 1-3. Alternatively, the search field 408 is dynamic and responds to letters entered as they are entered. In example 400, a query 418 for SHOES is entered into the search field 408, and results are provided in section 404 of the interface 402. As illustrated, there are three results 410-414 on display, with an indication for more results (e.g., down arrow with text "MORE" at the bottom of the page 402 or the grey scroll indicator on the right of the page 302) if the display content was scrolled down.

Result 416, while illustrated in the search results may load after the existing results—i.e., after results 410-414, are loaded. Categories 406A, 406B, and 406D within the results are presented on one side of the results, while sponsored content may be displayed on other available area 406C. Category 406D may be a new category based on machine learning from the reviews left following confirmed purchases of an item. For example, commonly used terms associated with reviews for searches and purchases of SHOES are variations of HIKING and RUNNING. As a result, the machine learning using the previously described neural network(s) may then use the learning that the word SHOES bear semantic similarity to HIKING and RUNNING. Interface 402 may be modified by a query assist module of the system to include new categories 406D for HIKING and RUNNING—associated with the query SHOES 418.

Results 410-414 are illustrated as results that modify a prior set of results provided for a default listing for the interface; e.g., interface 102 of FIG. 2. In particular, a first interface, e.g., interface 102, may be provided with a listing of popular products at the time of the query. Subsequently, responsive to a new query that may be determined as associated with a stored query, a query assist menu 420 may be provided. Query assist menu 420 at least modifies the first interface. The query assist menu 420 may also be provided over the popular products of the first interface. In the query assist menu 420, there is area 420A provided for one or more query assists—e.g., "Shoes for Running 'Sneakerun's sneaker is the lightest running . . . ' 420B, "Shoes for Hiking" 420C, and "Shoes for Cold Weather Climbing" 420D. The query assist includes selectable links titled with the query and descriptors or portions of descriptors, as explained with respect to FIGS. 2 and 3. In an alternate implementation, an area 416A may be provided in interface 402 with the query assist for the query. On selection of one of the selectable links, the interface is modified (or only area 404 is modified) to display items of the listed items that are associated to a descriptor underlying the selected selectable link. Furthermore, the modification to the interface may be to rearrange or rank the displayed items as most relevant to the selected selectable link. One of ordinary skill would understand that example 400 provides results 410-414 in interface 402 as an example only, but that if the query is not submitted, then the query assist menu 420 may be provided over any prior listing of items or results to invite a selection from the user entering the query. When a selection 420E of a selectable link from the query assist menu 420 is made, then the results 410-414 are provided.

Result 410-414 includes shoes for running corresponding to selected selectable link 420B, which is highlighted by a highlighting to indicate selection 420E. As such, the query is associated with the descriptor RUNNING from prior reviews for the items in results 410-414. In particular, however, at least one item, such as item 410, which is also highlighted, may have the closest review using words that are semantically closest to the word RUNNING and is provided with prominence in the results. Separately, additional selectable links 416A may be indicated by special bordering 418B or markings, e.g., marking 418A stating NEW as to the query assists available as responsive to the query. In an alternate implementation, a highlight or marker of any sort may be applied to the query assist or to the top item portion of the results in section 404 to reflect that dynamic modification has occurred. The example marked highlight 418A is illustrated over the slot 418B to reflect this. In addition, a decay function may be associated with the marked highlight 418A or slot 418B. The decay function, in one example, may cause the highlight to draw the customer's attention to it and then fade over the decay time set in the decay function. Such an implementation further improves the user interface displayed in the example electronic marketplace as discussed above. For example, the decay function improves the ability of the computer to display information and interact with the user through the use of content modification that dynamically indicates relevant information to the user's query.

In aspects of this disclosure, other locations for the slot 418B may be provided in the interface 402. Further, the title or the slot may include embedded hyperlinks as selectable links to results pertaining to the particular selectable link or to filter the existing results to display the results pertinent to the particular selectable link. In addition, excerpt 416B, from the feedback, may be provided with the query assist in both sections 416A and in the query assist menu 420. In another aspect, along with or separate from the marked highlight 418A, the modified portion of the interface 402 might be subject to the decay function as well. For example, the modified portion—the slot 416A and/or the query assist menu 420—may fade to the unmodified portion or to display results best matching the query. Alternatively, a hover-over event may be implemented for a cursor action. Here, a timing function determines the hover-over time of a cursor over the modified portion (e.g., marked highlight boundary of slot 416A). As such, when the cursor hovers over the query assist area 416A for the time specified in the timing function, the modification may remove the modification to interface 402.

In another example aspect, the excerpts from the feedback 416B may be displayed as an image from the review with information of the reviewer provided that permission is granted to share the review. Such excerpts may be retrieved as part of the indexing process described with reference to at least FIGS. 2, 3. In an example, the system of the disclosure herein is available to modify any content than an interface for results. For example, in audio-based or image-based searching process, a similar manner as described above is applicable. For a received audio-based or image-based query, semantically similar or same audio or images from reviews provided by users for past purchases of a related item are generated. The semantically similar or same audio or images may be extracted and indexed along with identifiers for the query and the item. Video searching is similarly possible using frames within review video demonstrating the product that is produced as part of a review. Portions of the video determined to include the product and an activity may be indexed, for instance. In an example, using frames from a video, actions of a participating individual may be determined using a stick model for joints of the participating individual and comparing motion of the stick model with a trained neural network of features typical for certain activities like running, playing a sport, walking, etc. In an example, audio-based searching may use text-to-audio read-back of reviews, where the text reviews are read-back with a modification to an audio-based set of results that are being announced in response to an audio-based query.

In an aspect, the present system supports or enables ranking of descriptors to select a descriptor associated with a confirmed purchase that has a threshold number of purchases. To do so, the system determines a first identifier for an individual one of the items. This may be by the review indexer. In an example, for various descriptors, such a ranking process is pre-computed and indexed with the descriptors, thereby providing associated descriptors a ranking to one or more parts of a query. Then the descriptors may be indexed along with the first identifier. A determination may also be made for second identifiers for individual ones of the descriptors and the descriptors may be indexed along with the second identifiers. In an example, the second identifiers may be ranked first to select the portions of the descriptors is enabled such that a number of purchases that satisfies a threshold is returned. The number of purchases is a reference from after a selection of an associated selectable link that comprises the portion of the descriptors. In this manner, it is ensured that the ranking follows from purchased items that are likely to be purchased once an associated query assist is provided in response to a query.

Results may be, therefore, grouped by latent interest (activity, audience, etc) as per categories or the menu of selectable links. In an example, the grouping is similar to a ranking of the most relevant results in a first page or first entries of the listing, followed by remaining results. This may be seen as an alternative or in addition to other ranking methods. In an example, auto-completion in the search query is more relevant using query assists, so that when an query is provided for "headphones," then the search bar suggests "headphones . . . for airplane travel" or plainly, provides an selectable link of "for running" as an available result or for selection. In response to a query for "backpacks," for instance, the search bar suggests "for parents" or "for hiking" based on these terms appearing in reviews left by customers who previously purchased select items using the query in searches prior to the current search provided. The present method and system supplements other methods of query suggestion, for example based on frequency of usage.

Recommendation of buying guides and reviews that address activities and audiences may be another example use of the present disclosure, where the recommendations are related to the search query. For example, in response to the query "mens shoes," an electronic marketplace may suggest a buying guide that discusses different types of hiking shoes and what to consider when purchasing them, in addition to product suggestions previously discussed. For a query of "alarm clock," the electronic marketplace may suggest alarm clocks for particular audiences, such as deaf and hard of hearing, or heavy sleepers. In each of the above examples, the results may additionally include annotations using excerpts and not just the descriptors.

FIG. 5 illustrates an example 500 of semantic processing for machine learning in accordance with various embodiments that may be applied to achieve the above modification of the interface. The machine learning of FIG. 5 may be implemented in server modules 324 to find descriptors in a review with matches to queries and to items identified as part of confirmed purchases. When the descriptors are found as identified by a machine learning algorithm, including following the process in FIG. 5, then the descriptors form a basis for providing query assist to subsequent queries that are similar to the queries for which the descriptors are found. In an example, the descriptors may be identified for training a neural network to a query or for training a neural network to multiple queries, or for training multiple neural networks to query or to multiple queries, all prior to applying the trained neural network or trained neural networks for determining descriptors for subsequent queries. For the machine learning part, as illustrated in example 500, the reviews or entries 506A-D for the confirmed purchases are provided as individual words or phrases to the machine learning algorithm. In example 500, each entry 506A-D represents a review identified as associated to a query and to a confirmed purchase of an item shows in response to the query. In an implementation, an individual word 502A/502B is taken and may be combined with each other word 502D from a query to create a robust trained network for query recognition. Alternatively, the individual word 502A is taken and may be combined with the query to create a robust trained network.

Further, groups of words 502C/502E that are limited by a predefined number of words may be taken from a review and combined with other groups of words from the query related to the review for training a network. Such training may be supervised or unsupervised. From the example in FIG. 5, a machine learning trained dataset would be able to distinguish reviews as semantically similar to certain queries and to certain items associated with those queries. For example, taking review 506C, the words DRESS and SHOES may be taken alone and/or together with the word FORMAL to form datasets for training a neural network. The neural network is informed that the reviews 506A-D are from purchases related to shoes, where the query is in the form of different references to shoes. As such, the neural network, once trained, may be a singular network trained to distinguish future reviews for shoes by analysis of terms provided in the review against the trained neural network. Alternatively, there may be singular neural network, one for each type of shoe, based on the query, the review, and the item under confirmed purchases. A subsequent query for shoes using any semantic language to the language used to train the neural network will be classified by the trained neural network as relating to one or more reviews. The one or more reviews are to different types of shoes—e.g., shoes for running, hiking, etc. As such, a trained neural network would then suggest "shoes for running" and "shoes for hiking" as the query for "shoes" is provided.

In FIG. 5, a select root term and/or its grammatical variation may be chosen (e.g., reference numerals 502D) around which the training is performed. For example, in the reviews 500, a similar or semantically closest term to one or more query terms from the query is determined. Alternatively, one or more query terms of the query is used as a root term. Further, for a number of similar or same items confirmed as purchased, the reviews may be grouped together with the queries used to generate the similar or same items as a result. Then the one or more query terms is determined from the grouped queries. This may be by selecting a most common term from the grouped queries or by selecting a significant term from the grouped queries. Other statistically applicable methods may be used—e.g., mean, median, or mode—to select a significant term from the grouped queries. A similar process is separately possible for the grouped reviews. Thereafter, the selected term is used as a root term.

Reviews are then parsed to include a respective root term 502D with other terms from each review to create a set that includes the respective root term. This is illustrated in extracted examples 508. The extracted examples are used to train a neural network to determine a relationship between any of the review terms to the respective root term. Each term associated with the respective root term of the extracted samples 508 then provides context to the root term and helps with the machine learning process. The remaining queries 504 in reviews 500 may be rejected as not relevant, unless a neural network is built to provide relevance to these terms. As a result, instances of words or phrases 502A-E are associated with groups or individual words for training a neural network to create a dataset of recognized words or phrases associated with a trained word or phrase (e.g., the root terms in example 500). In the machine learning process, extracted samples 508 are extracted from the reviews 500 and include one root term (and/or its grammatical variation) 502D for example purposes.

The machine learning process trains a neural network (NN) to recognize that SHOE AND SNEAKER or SHOE AND RUNNING as sharing a contextual relationship such as a semantic relationship (e.g., used together in a review). Similarly, DRESS AND SHOES, and SHOE AND COLD WEATHER share semantic relationships for being used with each other. A trained neural network using the above extracted samples 508 may then respond to a subsequent query for SHOE entered to the trained neural network by identifying LIGHTEST, RUNNING, TOUGH, or COLD WEATHER as query assists and/or categories. This may be a determination process for descriptors that provide detail responsive to the query. So the query for SHOE generates one or more types of query assists that include the descriptors—e.g., based on quality: SHOES THAT ARE LIGHTEST or SHOES THAT ARE TOUGHEST; or based on activities: SHOES FOR RUNNING, SHOES FOR HIKING, SHOES FOR COLD WEATHER, etc. There are large numbers of such queries that are utilized in the machine learning process and that provide similar contextual input. A robust dataset is enabled by providing as many qualified review terms and associated query term—as sets—for confirmed purchases to train the neural network.

Further, while the extracted samples 508 are illustrated as a root word or phrase and associated word or phrases, a window of three or more terms may be used to provide additional context. When the three or more terms are taken together, they may form an excerpt that is also used to provide detail responsive to the query. The neural network, in such an implementation, may be trained to recognize that each root word or phrase may be semantically related with two or more associated terms. While providing training vectors 510 for each word or phrase, it may be prudent to use a more robust training vector. The training vectors 510 may represent a single word with 0s in all rows, but a 1 in a single row to represent a word—e.g., SHOE or SHOES. This is also referred to as a one-dimensional representation of a word. The training vectors 510 may be used as provided, but an option to use distributed training vectors 600, as illustrated in FIG. 6A, is also available. The distributed training vectors may be a transformation of one-dimensional training vectors to form a multi-dimensional representation of words. As such, this transformation may be seen as a process of determining vector of semantic terms (e.g., a sentence) by averaging individual terms in the individual vectors.

In an implementation, the one-dimensional representation of a word may be prepared for the transformation to a multi-dimensional representation of words based on a matrix multiplication with a feature matrix. The feature matrix may provide the word's relationship to other words forming the multi-dimensional representation. For example, using a single word's one-dimensional training vector, a neural network with a hidden layer and multiple related words may be trained to recognize the single word from multiple related words. In such an implementation, back propagation of error and feed-forward processes may correct initial random values in the hidden layer to an accurate representation of a multi-dimensional vector for the word's relation to other words. In FIG. 6A, the words in the query of FIGS. 1, 4, and 5 are provided in comparison with other words generally available in a database of terms through a multi-dimension vector.

In another example aspect, word-to-word comparison may be performed, and may be extended to multiple words in a window of words. A training vector for a word, as illustrated in reference number 510, may be first converted into a feature representation using a feature matrix. A feature matrix is composed of various values associated with unique features in text. For example, words with known relationships to other words may be a feature predefined in the feature matrix. In an example, the feature predefined in the feature matrix may be predefined language associated with at least one or more of activities, audiences, and interests. The distributed representation vectors 600 may represent one such implementation. The training vector for a word may be multiplied with the feature vector to provide the feature representation. As the training vector for each word is a single row of multiple 0s and a single 1 entry, the resulting feature representation will be a single row of multiple columns of values. To find a relationship between words, two respective feature representations—one for each word—is multiplied and fed to a classifier. In an example the classifier may be a softmax classifier which is a normalized function that marginalizes the largest value from the lower values in a provided input. As a result, highly related words are classified in a manner to distinguish a lesser relationship word-pair.

For example, the multiplied values from the feature representations of word A with a word B may provide a singular value. A similar evaluation of word A may be performed with multiple words. Following this, the classifier may be applied to the collection of singular values to provide a vector distribution of the words associated with word A in different levels of closeness (e.g., similarly, same word, or semantic similarity). The closeness demonstrates a relationship from prior use of the words associated with word A. The vector distribution may represent a trained network which will be able to predict a word to output when the input word is Word A, following from the above example. Considering the above application in a multi-dimensional plane, with multiple words and relationships, a trained neural network will be able to identify relationships based on the numerical values associated with words. As such, an input of two or three words allows the trained neural network to predict a word that is bears a relationship to both words. Such a trained neural network may also be designed to provide a level of closeness (semantic relationship or similarity) between words in a review to a query.

FIG. 6B illustrates another intermediate processing feature for modifying content based in part on a query. When a trained neural network indicates that semantic relationships exists between terms in the review and terms of query to be stored for future queries, then the trained neural network may be configured to store and provide such information. In FIG. 6B, the information as to semantic relationships is provided in the form of a graph 602. For new query words SHOE and SHIRT, the graph demonstrates what the trained neural network may see—including relationships of these words with respect to certain review terms—e.g., RUNNING, SNEAKER, and HIKING, as demonstrated in the feature matrix 600 of FIG. 6A. While the graph is provided to visualize distances between words as defined in their determined semantic relationships, it is understood that a configured system may not graph the relationships, but merely provide the outputs. As a result, the closest determined terms, by semantic relationships, may have the least distance as calculated by a cosine distance measure or a Euclidean distance measure—once normalized.

In an application of the above trained neural network, once a correlation of descriptors to queries is completed by generation of the trained neural network, new query terms may be input to the trained neural network to get the associated descriptors that are not merely a word match to the query, but include a semantic match as well. In an implementation, the above machine learning is performed in a continuous manner, but at least after reviews for recently purchased items is provided with their associated queries. Such an implementation represents pre-commutation to improve results for future searches and to make the computing process more efficient. The pre-computation may occur in anticipation of further queries to items in the content database based at least in part on the new reviews published in one or more websites. In an example, the pre-computation process monitors for the new reviews after confirmed purchases and stores semantically similar terms to the queries, but also indexes reviews for subsequent queries. This improves latency of the query process from users' perspective, but also enables efficient computing as it reduces the burden on the content server (including its related computing devices and modules) to generate semantic descriptors for the query assist on-the-fly. The combination of pre-computed modification at near real-time modification of an interface with dynamic modification may also be implemented depending on work-load at the content server. At high traffic times, the work-load may be higher and the demand for resources may need to be balanced with respect to the in-demand content. In such instances, pre-computing may be triggered to benefit the dynamic modification for the interface.

As a result, the use of the present content searching process additionally provides a solution to a network and computer related issue of latency and traffic management for high traffic networks. A user able to secure their specific match, via the query assist, may not browse through multiple pages of search results or may not select to open multiple pages of product information from the results. This reduces traffic to the content server (and related computing devices). This also reduces the work-load to these devices or allows the devices to be used to perform other tasks—e.g., improving the dataset—than providing pages of results. In addition, this also removes from any requirement to store results for anticipated access when the system provides the query-specific search results in the very first page. This alleviates storage issues as the content server processes query and retrieves data for numerous queries every second.

Another technical benefit realized in the use of the present disclosure is the ability to efficiently use display space in the user interface of the electronic marketplace or content display. The specific query assist or categories may be provided in specific areas of the interface as illustrated in FIG. 4, with subsequent results provided in the remaining area previously allocated for the purpose. The user interface may also be dynamically modified in certain areas executing the appropriate dynamic script to indicate the specific search results separately from the general search results that are based on prior searches. Such areas can include sponsored search results (e.g., paid content), including advertisements as to accessories for the new product. In an example, when a request is determined as from a mobile device or using a connection deemed as limiting (e.g., cost prohibitive or high loss/latency connections), it may be most efficient to provide the specific query assist prior to any kind of content results. This may require dynamic modification of the display content to display the query assist followed by specific content in response to a selection of a selectable link of the query assist. This represents an exact match for a user's query in accordance with the latest reviews provided in a timely manner—e.g., a new product launched is immediately reviewed and dynamic categories or query assist is provided for subsequent searches instead of the typical search results of a previously highest selling product based on previous user behavior.

Figure 6C:
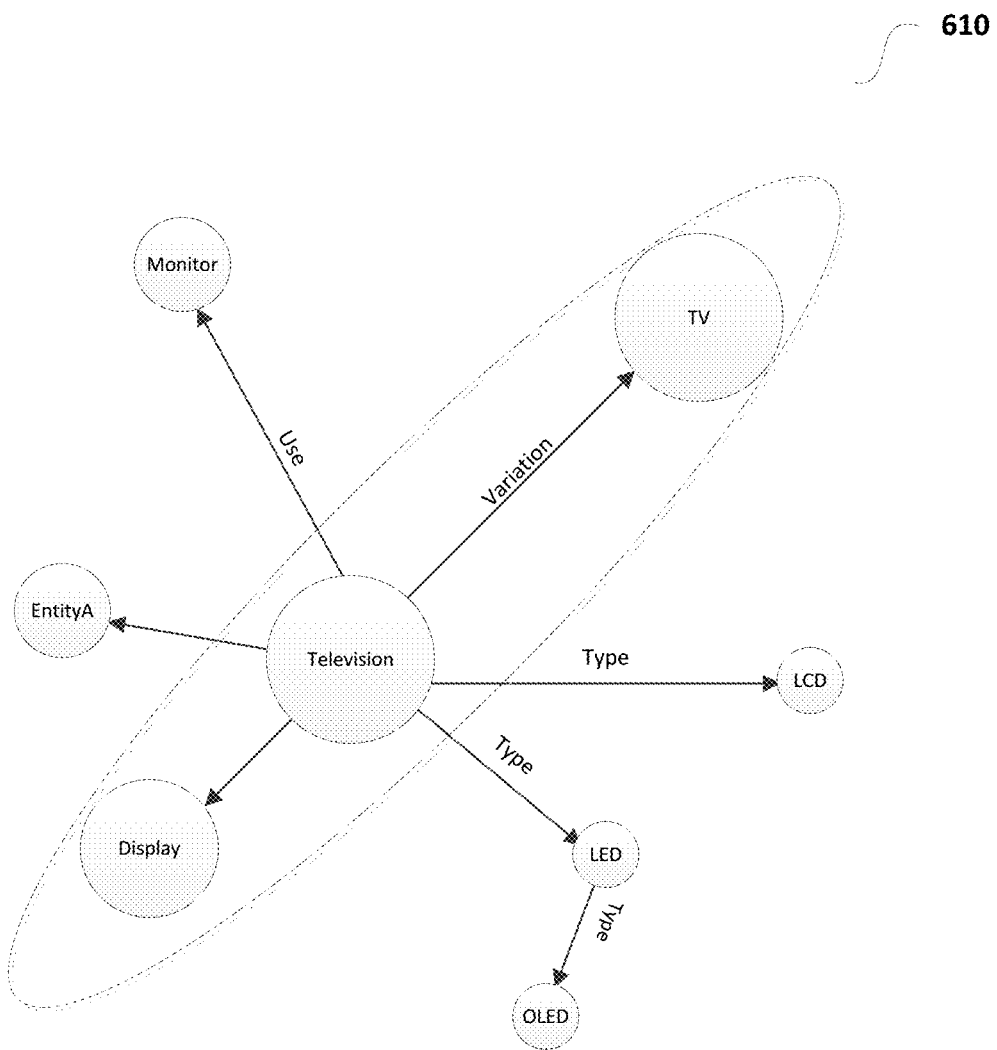
FIG. 6C illustrates another example of using knowledge graphs to find variations of descriptors in reviews used in the machine learning process for query assists in accordance with various embodiments.

FIG. 6C illustrates another example of using knowledge graphs to find variations of descriptors in reviews used in the machine learning process for query assists in accordance with various embodiments. In FIG. 6C, an example knowledge graph is provided. The example knowledge graph represents entities using multiple equivalent names, which may be variations of descriptors, for instance. For example, a review may include terms for a television, including its alternative terms commonly used—e.g., "tv" or "television." This may also include slags or tangential language for television, including telly, LCD, LED, Display, or combinations of terms, including LCD display, for instance. Variations of terms as determined to be closest in the customer reviews then required treatment of the customer reviews as to the same item and as related to the same query. The variations are treated as equivalent identifications of a primary term, i.e., television in this example. This process allows better or more coverage to the reviews that may be considered in the classification process for indexing descriptors, and also allows for more descriptors to be incorporated into the indexing and machine learning processes.

In a further aspect, the knowledge graph 610 of FIG. 6C may include names or representative entities using multiple equivalent names. For example, entity XYZ can have alternative names "tv" or "television." All the alternative names in the customer review may be treated as equivalent identifications of entity XYZ, which allows for better coverage of items from the entity for instance. An aggregate confidence may be assigned to the relationship for each word to the entity. The aggregate confidence may be, in an example, a value from 0 to 1. The aggregate confidence may be further taken for all relationships of terms for an entity. This may be by a unique identifier associated with an item that tracks back to a manufacturer, for instance. In an example, this unique identifier may be a Universal Product Code (UPC), an European Article Number (EAN), an International Standard Book Number (ISBN), or an Amazon Standard Identification Numbers (ASINs). The ASIN association, for example, may provide overall matches of an entity in all reviews for the ASIN underlying an item.

The present disclosure also supports or enables a probabilistic model between queries and entities. In an example, behavioral data from past purchase and interaction logs related to a unique identifier, such as ASINs, responsive to queries may be used to generate an association score between Query text and the ASIN. This may be given by probability measure $P(A\_i|Q\_j)$, where $A\_i$ is a specific ASIN and $Q\_j$ is a specific query. Entities in a knowledge graph may be identified from ASIN in reviews by an association strength between the ASIN and the entity. Such a probability measure may be represented as $P(A\_i|E\_k)$, where $A\_i$ is an ASIN and $E\_k$ is an entity from the Knowledge Graph. A joint neural network model may be trained or built to predict the entities associated with a query by creating $P(E\_k|Q\_i)$ from the above probability representations. This model can be implemented at a query level. In an example, this model may be implemented by treating each query as distinct, or using a Long Short-Term Memory (LSTM) sequence model, which predicts from a sequence of characters in the query.

Figure 7A:
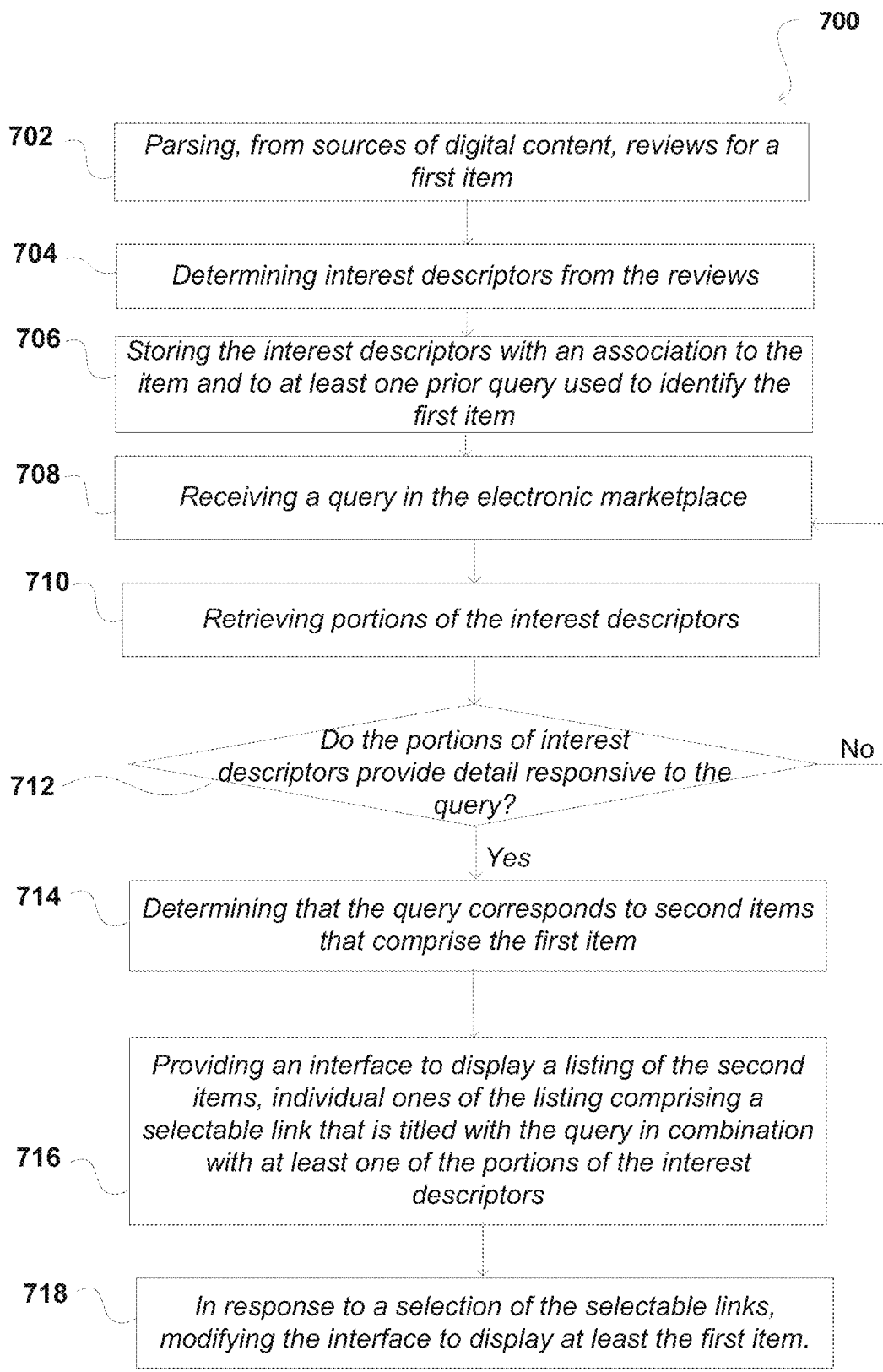
FIGS. 7A and 7B illustrate example process flows to index and present search results using feedback, in accordance with various embodiments.

FIG. 7A illustrates an example process flow 700 to index and present search results using feedback, in accordance with various embodiments. Sub-process 702 parses reviews for a first item from sources of digital content, such as content websites or an electronic marketplace. The reviews are for the first item that is provided responsive to a prior query in the electronic marketplace and that has been subsequently purchased. Sub-process 704 determines descriptors, such as interest descriptors, from the reviews. As previously discussed, this may be by selecting terms or phrases or by finding plainly similar terms in the reviews and by rejecting other language deemed unimportant to classify the query. In addition, as the reviews are provided after an associated first item, responsive to the prior query, is purchased, the descriptors bear association to the first item. In an example, the determination of descriptors allows training of a neural network for classification of the descriptors for the prior query within classification areas defined in at least two dimensions—the descriptors forming one dimension and terms in the prior query forming another dimension. In an example, the trained neural network is capable of finding semantic descriptors to subsequent query terms. Additionally, subsequent reviews are used with subsequent query terms to improve robustness of the trained neural network by further training. This process is as described with respect to FIGS. 5, 6A, and 6B. Alternatively, the neural network may be initially trained with a vocabulary provided to the neural network and using the processes in FIGS. 5, 6A, and 6B.

Sub-process 706 stores the descriptors with an association to the item and to at least one prior query used to identify the first item. In sub-process 708, a query is received in the electronic marketplace. In sub-process 710, portions of the descriptors are retrieved that may be responsive to the query. This may be by the processing the query as input to the trained neural network to find semantic descriptors to the query. This is as described in the above descriptors with respect to FIGS. 2-6B. Sub-process 712 verifies that portions of the descriptors are determined as responsive to the query. When such verification determines that portions of the descriptors are responsive to the query, sub-process 714 is performed. Otherwise, sub-process 708 is cycled for further parts to the query. For example, a user may type additional words or letters or phrases to define the query if there are no query assists provided. Sub-process 714 then determines that the query corresponds to second items that include the first item. Sub-process 716 provides an interface to display a listing of the second items. A person of ordinary skill would understand from the present disclosure that selectable links may be embedded as underlay with titles provided for plain reading of what the selectable links represent. In an example, a hyperlink may be embedded by a title provided to the hyperlink. Nevertheless, the display of a selectable link titled with query and portions of the descriptor is plainly a display of the title and the selectable link is part of that display. Each entry of the listing of the second items includes a selectable link that is titled with the query in combination with at least one of the portions of the descriptors. Further, in sub-process 718, in response to a selection of the selectable links, a modification to the interface is performed to display at least the first item.

Figure 7B:
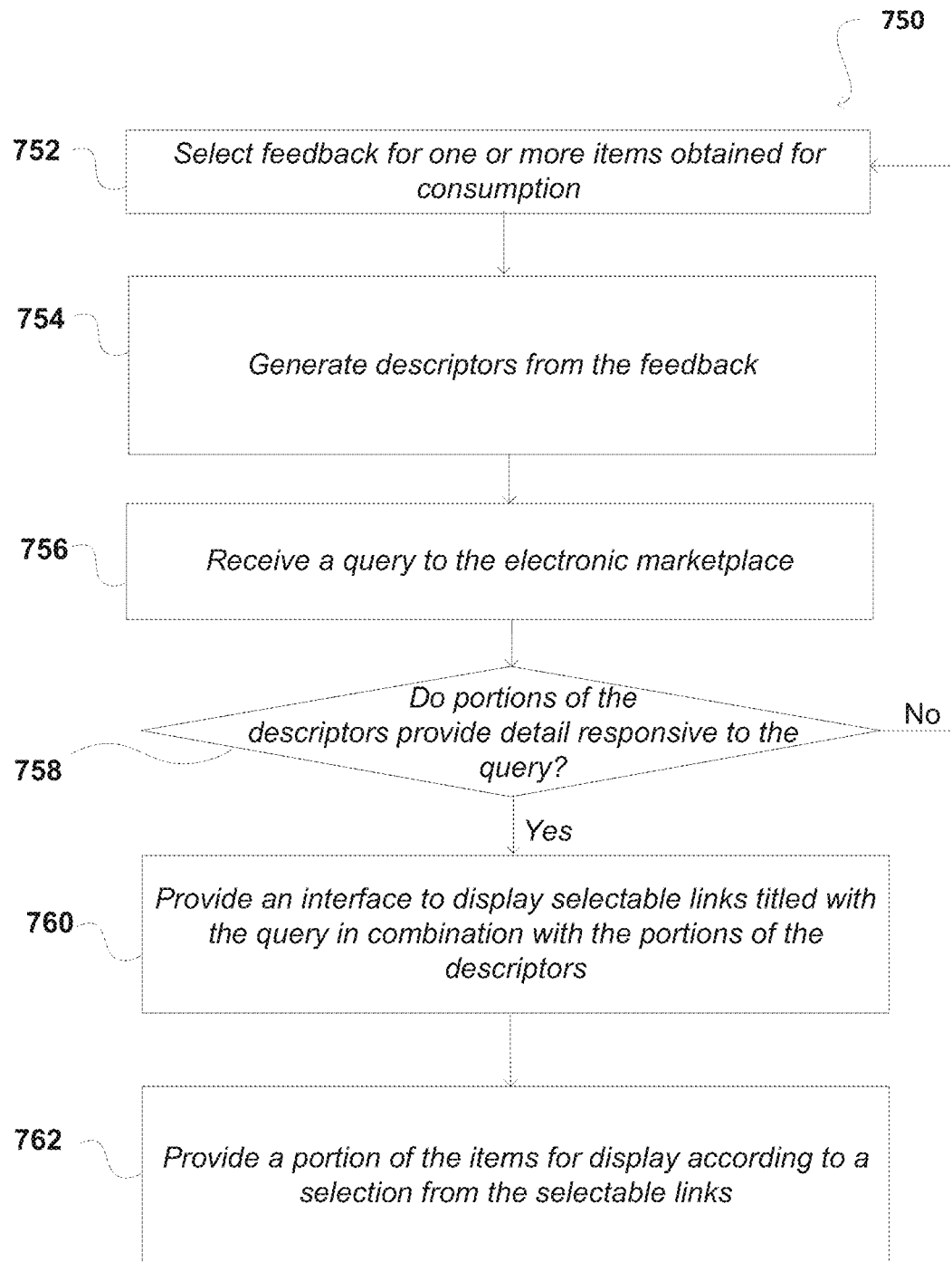

FIG. 7B illustrates an example process flow 750 to index and present search results using feedback, in accordance with various embodiments. Sub-process 752 selects feedback for one or more items purchased from an electronic marketplace. Sub-process 754 generates descriptors from the feedback. In sub-process 756, a determination is made that portion of the descriptors provides detail responsive to a query for the one or more items in the electronic marketplace. In an example, the query is received after prior queries result in the feedback for items purchased from the electronic marketplace, where the query is associated with prior queries and where the descriptors is associated with the items. Sub-process 758 verifies if portion of the descriptors provide detail responsive to the query. When no descriptors provide detail responsive to the query, more feedback may be selected to cycle through sub-processes 752-758. When the descriptors are determined as providing the detail responsive to the query, sub-process 760 is performed. In sub-process 760, an interface is displayed include selectable links titled with the query in combination with the portions of the descriptors. In sub-process 762, in response to a selection of one of the selectable links, a portion of the items are displayed. A selection of one of the selectable links may effectively filter the items to provide at least the item and/or the portion of the item. For example, a portion of related items to a portion of the descriptors underlying the one selectable link may be displayed.

Figure 8:
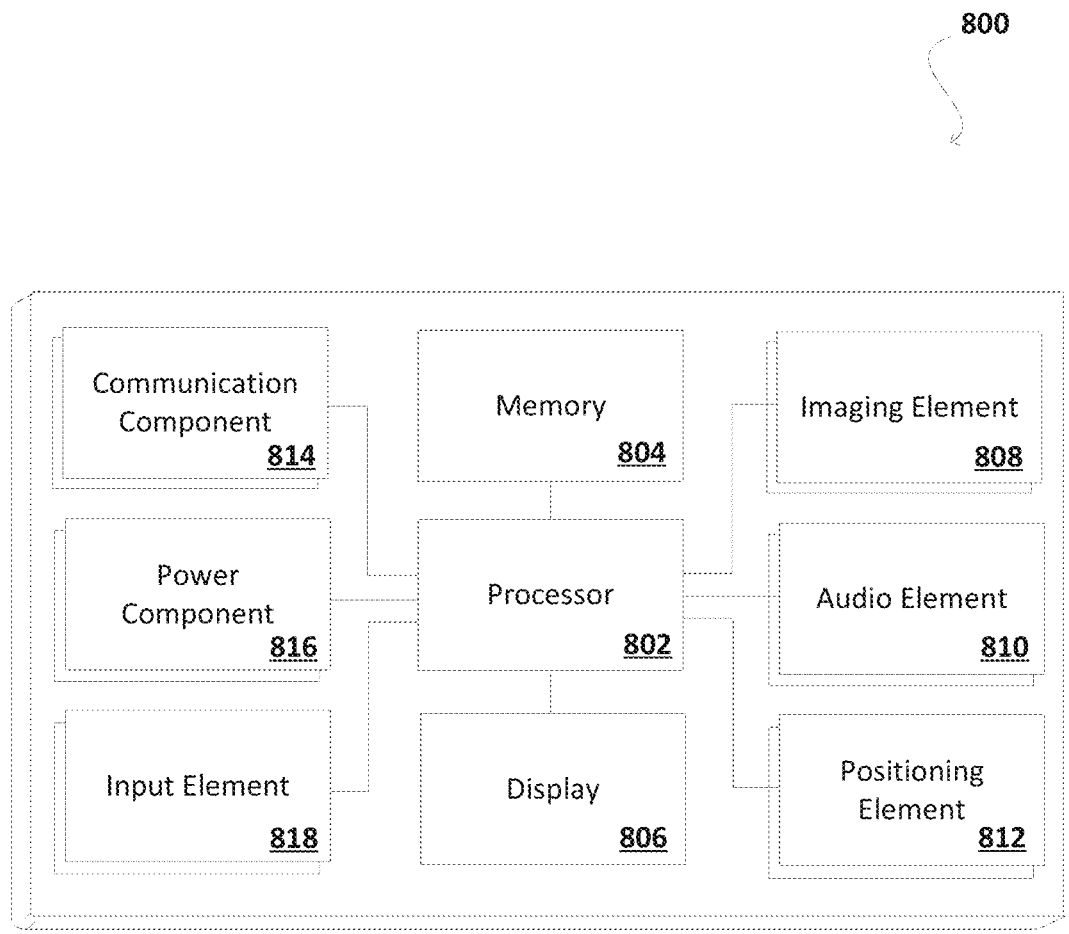
FIG. 8 illustrates example components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device 800 can include many types of memory, data storage, or non-transitory computer-readable storage media, such as a first data storage for program instructions for execution by the processor 802, a separate storage for images or data, a removable memory for sharing information with other devices, etc. The device may include a position element 812 to provide positioning for updated results based on geographic position of the device 800. The device 800 will include some type of display element 806, such as a touch screen or liquid crystal display (LCD), although devices such as portable media players might convey information via other means, such as through audio speakers. As discussed, the device in many embodiments will include at least one input element 818 that is able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands using imaging element 808 and audio element 810, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet using communication component 914, and may be able to communicate with other such devices using this same or a similar component. Components 802-814 and 818 may be powered by power component 916 using internal or, in combination with, an external power supply.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component 814.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server will include an operating system that provides executable program instructions for the general administration and operation of that server, and will include a non-transitory computer-readable medium storing instructions that, when executed by a processor of the server, allow the server to perform its intended functions. Suitable implementations for the operating system and functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python®, or Tool Command Language (TCL), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    enabling access to feedback for listings of content;
    generating descriptors from the feedback;
    associating a query to the descriptors and to an individual listing of the listings of content;
    enabling an interface to display at least one selectable link titled with the query in combination with at least one portion of the descriptors; and
    enabling the individual listing to be displayed according to a selection of the at least one of the selectable link.

2. The computer-implemented method of claim 1, further comprising:
    generating the interface to comprise a first area for results associated with the query and to comprise a second area; and
    dynamically modifying the interface to comprise, in the first area or the second area, one portion of the listings of content.

3. The computer-implemented method of claim 1, further comprising:
    determining that the query is associated with a category based on a classification of at least one portion of the query in a classified dataset that provides categories and content;
    determining category-specific content for the category; and
    identifying the at least one portion of the descriptors from the category-specific content.

4. The computer-implemented method of claim 3, further comprising:
    providing the interface to render on a client device;
    receiving a second query in the interface; and
    based at least in part on a script rendered with the interface, modifying the interface to comprise third items that are responsive to the second query, individual ones of the third items comprising a second selectable link that is titled with the second query in combination with at least one second portion of the descriptors.

5. The computer-implemented method of claim 1, further comprising:
    parsing at least one identifier of a website associated with the content to determine domain information;
    determining a confidence score associated with an entity, the entity associated with the domain based at least in part on the domain providing information for at least one of the listings of content; and
    when the confidence score exceeds a threshold value, providing the feedback from the website for the descriptors.

6. The computer-implemented method of claim 5, further comprising:
    parsing websites to select sets of contiguous words associated with the listings of content;
    when at least one set of contiguous words is selected, incrementing a count; and
    weighing the confidence score favorably for the domain when the count satisfies a threshold.

7. The computer-implemented method of claim 1, further comprising:
    determining a purchase made in an electronic marketplace associated with the interface following a search using the query;
    determining the feedback provided to the electronic marketplace and associated with the purchase;
    parsing the feedback to select words or phrases that share a correlation or a semantic similarity to predefined language associated with at least one or more of activities, audiences, and interests; and
    classifying the select words or phrases as the descriptors.

8. A system, comprising:
    at least one processor; and
    a memory device including instructions that, when executed by the at least one processor, cause the system to:
    generate descriptors from feedback, accessibly by the system, for listings of content;
    associate a query to the descriptors and to an individual listing of content;
    enable an interface to display at least one selectable link titled with the query in combination with at least one portion of the descriptors; and
    enable the individual listing of content to be displayed.

9. The system of claim 8, wherein the instructions, when executed by the at least one processor, further cause the system to:
    for an individual letter, word, or phrase entered as part of the query in a search field of an electronic marketplace, generate an individual selectable link titled with a combination the individual letter, word, or phrase and the at least one portion of the descriptors;
    dynamically display, in a first area of the interface, the individual selectable link after entry of the individual letter, word, or phrase as part of the query in a search field of the electronic marketplace.

10. The system of claim 9, wherein the instructions, when executed by the at least one processor, further cause the system to:
    dynamically display a menu in the first area of the interface for comprising the individual selectable link as part of the at least one selectable link, the first area adjacent or contiguous to the search field of the electronic marketplace.

11. The system of claim 10, wherein the instructions, when executed by the at least one processor, further cause the system to:
- receive a selection of a different selectable link than the at least one selectable link; and
- modify a second area of the interface to include select content of the listings of content instead of the individual listing of content, the select content associated with the different selectable link.

12. The system of claim 11, wherein the instructions, when executed by the at least one processor, further cause the system to:
- list the at least one selectable link titled with the query in combination with the at least one portion of the descriptors in the first area of the interface, the at least one selectable link in a ranking with other selectable links to provide visibility the individual listing of content.

13. The system of claim 8, wherein the instructions, when executed by the at least one processor, further cause the system to:
- determine that the query is associated with a category based on a classification of at least one portion of the query in a classified dataset that provides categories and content;
- determine category-specific content for the category; and
- identify at least one of the portions of the descriptors from the category-specific content.

14. The system of claim 13, wherein instructions, when executed by the at least one processor, further cause the system to:
- index portions of the feedback as the descriptors along with an association to the category-specific content; and
- provide the portions of the descriptors for the combination with the query when the category-specific content is determined as being in the content category for the query.

15. The system of claim 8, wherein instructions, when executed by the at least one processor, further cause the system to:
- reject, from the feedback, articles and non-descriptors;
- classify remaining portions of the feedback, after the rejection, as the descriptors; and
- index the descriptors for use with the query.

16. The system of claim 15, wherein instructions, when executed by the at least one processor, further cause the system to:
- determine a first identifier for an individual one of the listings of content; and
- index the descriptors along with the first identifier.

17. The system of claim 15, wherein instructions, when executed by the at least one processor, further cause the system to:
- determine second identifiers for individual ones of the descriptors;
- index the descriptors along with the second identifiers; and
- enable ranking of the second identifiers to select the at least one portion of the descriptors that return a number of purchases that satisfies a threshold, the number of purchases after a selection of an associated selectable link that comprises the at least one portion of the descriptors.

18. A non-transitory computer-readable storage medium including instructions that, when executed by at least one processor of a computing system, cause the computing system to:
- generate descriptors from feedback, accessibly by the system, for listings of content;
- associate a query to the descriptors and to an individual listing of content;
- enable an interface to display at least one selectable link titled with the query in combination with at least one portion of the descriptors; and
- enable the individual listing of content to be displayed.

19. The non-transitory computer readable storage medium of claim 18, wherein the instructions, when executed by the at least one processor, further cause the computing system to:
- for an individual letter, word, or phrase entered as part of the query in a search field of an electronic marketplace, generate an individual selectable link titled with a combination the individual letter, word, or phrase and the at least one portion of the descriptors;
- dynamically display, in a first area of the interface, the individual selectable link after entry of the individual letter, word, or phrase as part of the query in a search field of the electronic marketplace.

20. The non-transitory computer readable storage medium of claim 19, wherein the instructions, when executed by the at least one processor, further cause the computing system to:
- dynamically display a menu in the first area of the interface for comprising the individual selectable link as part of the at least one selectable link, the first area adjacent or contiguous to the search field of the electronic marketplace.

* * * * *